(12) United States Patent  
Ishikawa

(10) Patent No.: US 9,210,063 B2  
(45) Date of Patent: Dec. 8, 2015

(54) BANDWIDTH POLICING APPARATUS AND PACKET RELAY APPARATUS

(75) Inventor: Yuichi Ishikawa, Kawasaki (JP)

(73) Assignee: ALAXALA NETWORKS CORPORATION, Kanagawa (JP)

(*) Notice: Subject to any disclaimer, the term of this patent is extended or adjusted under 35 U.S.C. 154(b) by 611 days.

(21) Appl. No.: 13/361,367

(22) Filed: Jan. 30, 2012

(65) Prior Publication Data

US 2012/0195201 A1   Aug. 2, 2012

(30) Foreign Application Priority Data

Feb. 2, 2011   (JP) ................................ 2011-020360

(51) Int. Cl.
| | |
|---|---|
| H04L 12/26 | (2006.01) |
| H04L 12/24 | (2006.01) |
| H04L 12/801 | (2013.01) |
| H04L 12/823 | (2013.01) |
| H04L 12/813 | (2013.01) |
| H04L 12/833 | (2013.01) |

(52) U.S. Cl.
CPC ............ *H04L 43/16* (2013.01); *H04L 41/0896* (2013.01); *H04L 47/12* (2013.01); *H04L 47/31* (2013.01); *H04L 47/32* (2013.01); *H04L 47/20* (2013.01); *H04L 47/2458* (2013.01)

(58) Field of Classification Search
None
See application file for complete search history.

(56) References Cited

U.S. PATENT DOCUMENTS 5,914,936 A   6/1999 Hatono et al.
6,493,316 B1 * 12/2002 Chapman et al. ............ 370/231
7,359,321 B1 * 4/2008 Sindhu et al. ................ 370/230
2005/0025158 A1 * 2/2005 Ishikawa et al. ......... 370/395.21
2006/0146708 A1   7/2006 Kanazawa

FOREIGN PATENT DOCUMENTS

JP   09-307561 A   11/1997
JP   2004-266389 A   9/2004

OTHER PUBLICATIONS

RFC3168, "The Addition of Explicit Congestion Notification (ECN) to IP", (http://www.ietf.org/rfc/rfc3168.txt), Sep. 2001.
RFC2581, "TCP Congestion Control", (http://www.ietf.org/rfc/rfc2581.txt), Apr. 1999.
RFC2582, "The New Reno Modification to TCP's Fast Recovery Algorithm" (http://www.ietf.org/rfc/rfc2852.txt), Apr. 1999.
S.S. Kunniyur et al, "An Adaptive Virtual Queue (AVQ) Algorithm for Active Queue Management", IEEE/ACM Transactions on Networking, vol. 12, No. 2, Apr. 2004.
The ATM Forum Technical Committee, Traffic Management Specification, Version 4.1, p. 24.

(Continued)

*Primary Examiner* — Khoa Huynh
(74) *Attorney, Agent, or Firm* — Mattingly & Malur, PC

(57) ABSTRACT

In a packet relay apparatus or bandwidth policing apparatus, when the bandwidth of a flow having a function to respond to a congestion notification surpasses a first threshold, a congestion notification is given to rewrite a value representing the congestion state of the network out of the packet headers of the packet received by the apparatus. The packet is dropped if the bandwidth of the flow surpasses a second threshold higher than the first threshold. One of the following, including packet drop, rewriting the value representing the priority level in the network out of the packet headers and altering the priority level in the apparatus is imposed on the packet when the bandwidth of the flows surpasses a second threshold higher than the first threshold.

14 Claims, 17 Drawing Sheets

(56) References Cited

OTHER PUBLICATIONS

T. Yazaki et al, "New Bandwidth-control Design: Policer for Probable Packet Discard (PPPD)", Proceedings of the 29th Annual IEEE International Conference on Local Computer Networks (LCN'04).

NII Journal, No. 3, (Nov. 2001) Feature: Treatises of Information Platform Commentary, "Traffic Control for QoS Guarantee in Communication Networks", Yusheng Ji, National Institute of Informatics (http://www.nii.jp/journal/pdf/03/03-04.pdf), p. 25.

IEEE Journal of Solid-State Circuits, vol. 41, No. 3, Mar. 2006, "Content-Addressable Memory (CAM) Circuits and Architectures: A Tutorial and Survey", K. Pagiamtzis et al, (http://static/pagiamtzis.com/publications/pagiamtzis-jssc2006.pdf).

\* cited by examiner

FIG. 6

FLOW SEARCH TABLE (41)

| | SOURCE MAC ADDRESS | DESTINATION MAC ADDRESS | SOURCE IP ADDRESS | DESTINATION IP ADDRESS | TOS | SOURCE PORT NUMBER | DESTINATION PORT NUMBER |
|---|---|---|---|---|---|---|---|
| INPUT LINE 1 | SOURCE MAC ADDRESS 1 | DESTINATION MAC ADDRESS 1 | SOURCE IP ADDRESS 1 | DESTINATION IP ADDRESS 1 | TOS 1 | SOURCE PORT NUMBER 1 | DESTINATION PORT NUMBER 1 |
| INPUT LINE 2 | DO. | DO. | SOURCE IP ADDRESS 2 | DESTINATION IP ADDRESS 2 | TOS 2 | SOURCE PORT NUMBER 2 | DESTINATION PORT NUMBER 2 |
| .... | | | | | | | |
| INPUT LINE 9 | SOURCE MAC ADDRESS 1 | DESTINATION MAC ADDRESS 1 | SOURCE IP ADDRESS 1 | DESTINATION IP ADDRESS 1 | TOS1 | SOURCE PORT NUMBER 1 | DESTINATION PORT NUMBER 1 |
| INPUT LINE 10 | SOURCE MAC ADDRESS 1 | DESTINATION MAC ADDRESS 1 | SOURCE IP ADDRESS 1 | DESTINATION IP ADDRESS 1 | TOS1 | SOURCE PORT NUMBER 1 | DESTINATION PORT NUMBER 1 |
| INPUT LINE 10 | DO. | DO. | SOURCE IP ADDRESS 2 | DESTINATION IP ADDRESS 2 | TOS2 | SOURCE PORT NUMBER 2 | DESTINATION PORT NUMBER 2 |
| INPUT LINE 10 | SOURCE MAC ADDRESS 1 | DESTINATION MAC ADDRESS 1 | SOURCE IP ADDRESS 2 | DESTINATION IP ADDRESS 1 | TOS1 | SOURCE PORT NUMBER 1 | DESTINATION PORT NUMBER 1 |
| INPUT LINE 11 | DO. | DO. | SOURCE IP ADDRESS 2 | DESTINATION IP ADDRESS 2 | TOS2 | SOURCE PORT NUMBER 2 | DESTINATION PORT NUMBER 2 |
| .... | | | | | | | |
| INPUT LINE n | SOURCE MAC ADDRESS n | DESTINATION MAC ADDRESS n | SOURCE IP ADDRESS n | DESTINATION IP ADDRESS n | TOSn | SOURCE PORT NUMBER n | DESTINATION PORT NUMBER 1 |

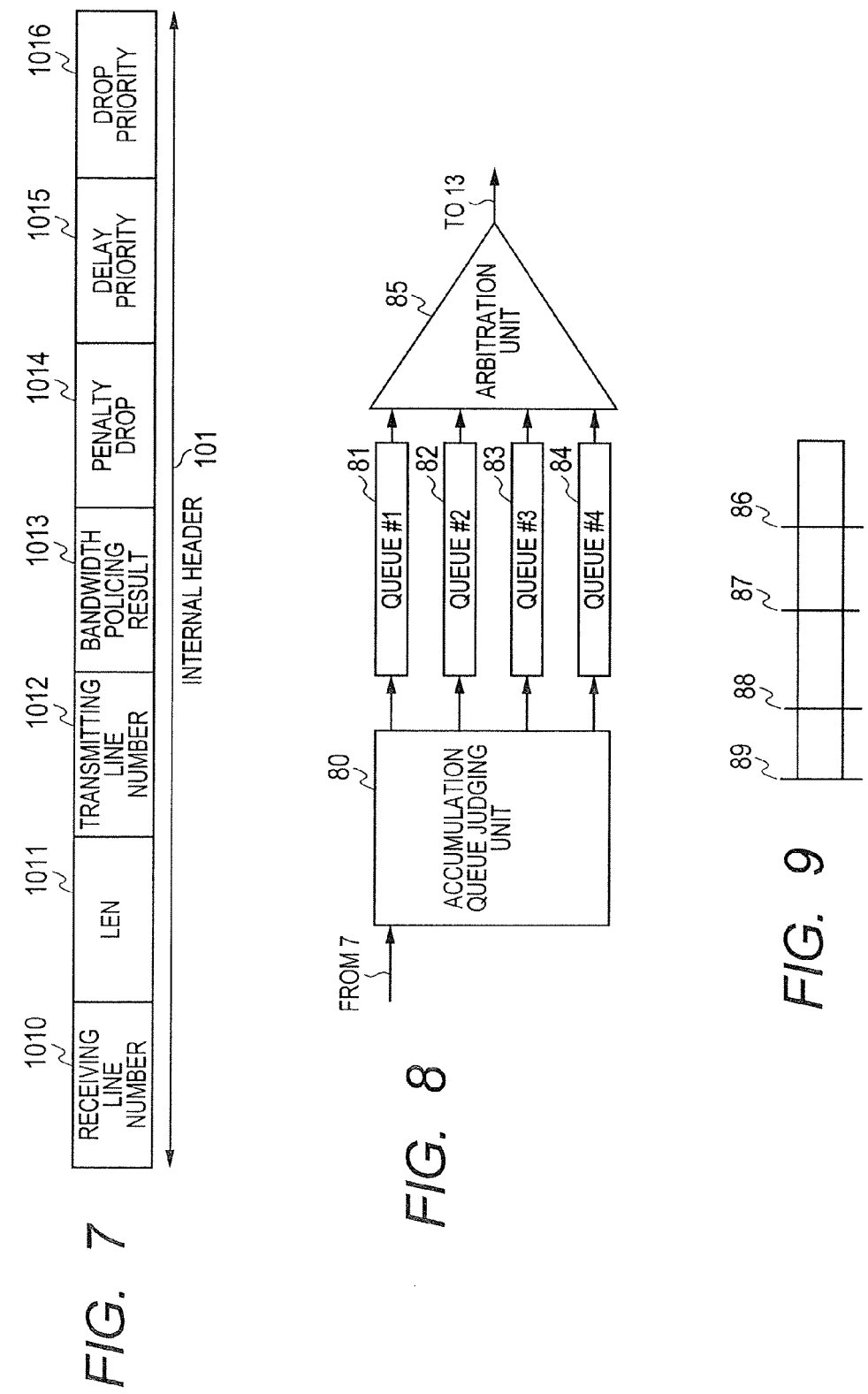

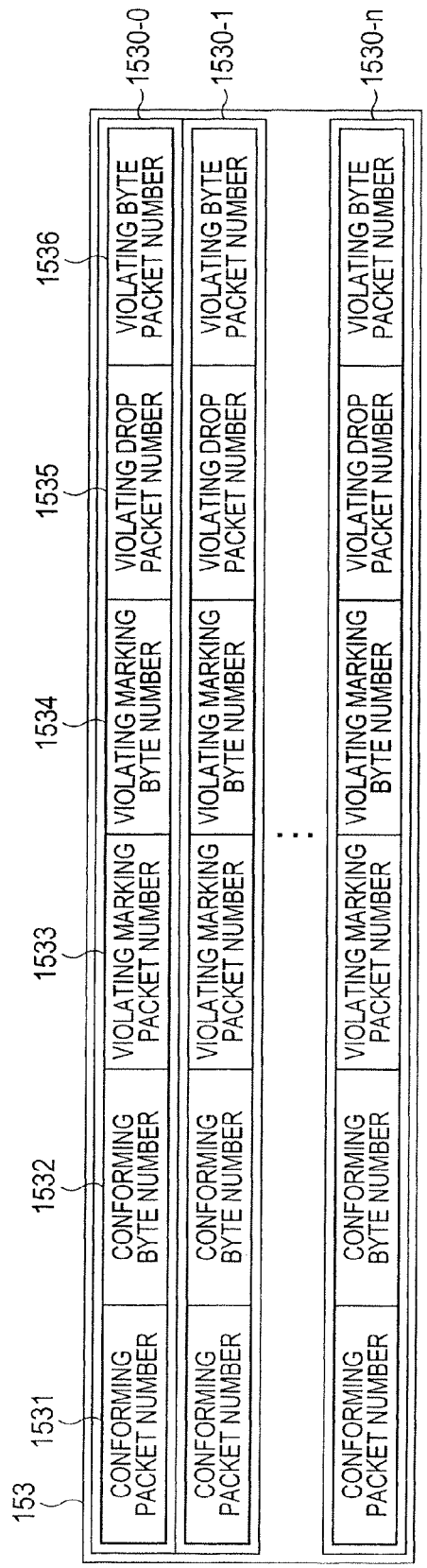

BANDWIDTH POLICING APPARATUS AND PACKET RELAY APPARATUS

CLAIM OF PRIORITY

The present application claims priority from patent Application JP2011-020360 filed on Feb. 2, 2011, the content of which is hereby incorporated by reference into this application.

BACKGROUND OF THE INVENTION

The present invention relates to a packet relay apparatus, and more particularly to a bandwidth policing technique for an apparatus having a congestion notification function.

In response to the U.S. government's recommendation on network neutrality and, reflecting this background, rising discussions regarding fair bandwidth allocation by the Internet Engineering Task Force (IETF), congestion notification techniques, such as the one taken up in RFC3168, "The Addition of Explicit Congestion Notification (ECN) to IP" (http://www.ietf.org/rfc/rfc3168.txt) (Non-Patent Document 1), are coming into the limelight.

ECN is a congestion notifying technique to cause the occurrence of congestion in a packet relay apparatus, such as a router/switch constituting part of a network, to be expressly notified by the router/switch itself to transmitting/receiving terminals.

The congestion control function according to the conventional Transmission Control Protocol (TCP) (RFC2581, "TCP Congestion Control", (http://www.ietf.org/rfc/rfc2581.txt) (Non-Patent Document 2) has no means of explicitly notifying senders/receivers of the occurrence of congestion. For this reason, when a packet drop in the network is detected by a sender, the occurrence of congestion is autonomously determined. And, if the occurrence of congestion is affirmed, the congestion is avoided by restraining the transmission bandwidth available to the sender.

BRIEF SUMMARY OF THE INVENTION

Where the ECN referred to above is used, when a packet relay device such as a router/switch detects congestion, it is defined by the Type of Service (TOS) of the IP header of the packet.

The router/switch marks the value of Congestion Experienced (CE) and relays the pertinent packet without dropping it as far as practicable. The receiver having received the CE packet sets, in an Acknowledge (ACK) packet subsequently returned to the sender, sets the ECN Echo (ECE) flag of the TCP control flag expanded for the ECN purpose to '1'. Upon receiving the ACK packet in which the ECE flag is so set, the sender avoids congestion by restraining the transmission bandwidth and sets in the transmit packet the Congestion Window Reduced (CWR) flag of the TCP control flag expanded for the ECN purpose. Upon receiving the packet in which the CWR packet is set, the receiver stops setting the ECE flag in the ACK packet.

By using ECN in this way, it is made possible to restrain packet dropping at the time of detection of congestion by the router/switch as far as practicable and to urge restraint on the transmit bandwidth by explicitly notifying senders/receivers of the occurrence of congestion while relaying packets, thereby enabling packet dropping and resultant deterioration of communication quality by retransmission of packets to be restrained. Also in ECN, it is made possible to clearly distinguish bit error trouble and network congestion from each other and to refrain from processing congestion avoidance against any bit error trouble, making possible unnecessary deterioration of the transmission bandwidth.

Documents regarding techniques of applying such ECN technology to virtual queues include Srisankar S. Kunniyur and R. Srikant, "An Adaptive Virtual Queue (AVQ) Algorithm for Active Queue Management", IEEE/ACM TRANSACTIONS ON NETWORKING, Vol. 12, No. 2, April 2004 (Non-Patent Document 4), which discloses a technique by which ECN marking is done when the number of bytes (VQ+b) in the virtual queue at the time of packet arrival surpasses the size of a virtual buffer (B).

The virtual queue as discussed in this Non-Patent Document 5 seems to be a concept similar to the leaky bucket algorithm disclosed in The ATM Forum Traffic Management Specification version 4.1, p. 24 (Non-Patent Document 5), but it is not a queue as such and functions as a virtual counter used in bandwidth calculation. This leaky bucket algorithm is a model of leaky bucket having a hole with a certain threshold (THR); as long as a certain quantity of water (CNT; hereinafter referred to as the bucket water quantity) is in it, the water continues to leak in the policed bandwidth (R) and, when a packet is inputted, water equivalent to the length of this packet is poured. To permit arrival fluctuations of the packet, the bucket is given a certain depth, and conformance is judged if the bucket is not overflowed while violation is judged if it is overflowed. The technique described in Non-Patent Document 4 seems to be, in the terminology of the leaky bucket theory, a technique regarding a leaky bucket that performs ECN marking when the bucket water quantity surpasses the threshold THR.

However, according to Non-Patent Document 4, only the ECN-based marking mechanism is used as the means of avoidance congestion. As a result, even if the bucket water quantity surpasses the threshold THR, no packet is dropped or a penalty, such as lowering the priority level of the packet, is not imposed either as long as the real buffer dries up. Accordingly, there is a problem that, during a round trip time RTT after the router/switch having a leaky bucket where congestion occurred marks a CE packet with ECN, namely from the time the receiver receives the CE packet and transmits the ECE-set ACK packet until the time the sender restrains the transmit bandwidth by receiving the transmitted ACK packet and the restraint on the transmit bandwidth is reflected in the state of the leaky bucket at the router/switch where the congestion occurred, packets unlimitedly flow into the subsequent stages of the network including the router/switch where the congestion occurred.

During this RTT, the quantity of packets received by the router/switch in excess of the threshold THR of the leaky bucket is normally limited to a certain level based on the congestion window control of TCP of the sender, but in the event of faulty mounting of the sender's congestion avoidance function, packaging different from standard specifications, a sudden increase in the number of senders or in like cases, packets will unlimitedly flow into the subsequent stages of the network. This would further lead to another problem that secondary congestion occurs in the router/switch itself having suffered the congestion or the subsequent stages of the network and invite deterioration in the communication quality of other flows.

Further, Takeki Yazaki, Takashi Isobe, Yuichi Ishikawa and Hiroki Yano, "New Bandwidth-control Design: Policer for Probable Packet Discard (PPPD)", Proceedings of the 29th Annual IEEE International Conference on Local Computer Networks (LCN' 04) (Non-Patent Document 6), variations of the congestion window and the bucket water quantity CNT over time in the conventional congestion avoidance function that detects congestion by packet dropping are described, wherein periodic variations are repeated in the RTT period. The congestion window means a data size which permits transmission without having to await an ACT packet at the sender's TCP, and the sender controls the transmit bandwidth by regulating the size of the congestion window. Therefore, the transmit bandwidth repeats periodic variations as does the congestion window. According to Non-Patent Document 1, control of the transmit bandwidth based on congestion avoidance function that detects congestion by ECN marking is the same as the control of the transmit bandwidth based on the congestion avoidance function in New Reno (RFC2582, "The New Reno Modification to TCP's Fast Recovery Algorithm" (http:www.ietf.org/rfc2852.txt) (Non-Patent Document 3), which is a congestion avoidance function generally used in conventional TCP to detect congestion by packet dropping. For this reason, the transmit bandwidth repeats periodic variations also in the case of using E$CN, which means the problem that the risk of congestion discussed above constantly arises.

An object of the present invention is to provide a bandwidth policing apparatus and a packet relay apparatus equipped with a congestion notification function capable of addressing the problems noted above.

In order to achieve the object stated above, the invention provides a bandwidth policing apparatus for packets on a network comprising a packet receiving unit that is connected to a receiving line and receives packets from a sender, and a packet search unit that searches the packets received by the packet receiving unit, wherein the packet search unit detects flows each comprising a set of the packets; polices the bandwidth of each of the flows; if the sender of the packets has a function to respond to a congestion notification to control the transmit bandwidth according to a value representing the congestion state of the network out of packet headers of a response packet, gives a congestion notification to have the value representing the congestion state of the network rewritten out of packet headers of the received packet when the bandwidth of each of the flows surpasses a first threshold; and imposes a penalty on the packet when the bandwidth of each of the flows surpasses a second threshold higher than the first threshold.

Also to achieve the object stated above, the invention provides a packet relay apparatus on a network comprising a packet receiving unit that is connected to a receiving line and receives packets from a sender, and a packet search unit that searches the packets received by the packet receiving unit, wherein the packet search unit detects flows each comprising a set of the packets; polices the bandwidth of each of the flows; if the sender of the packets has a function to respond to a congestion notification to control the transmit bandwidth according to a value representing the congestion state of the network out of packet headers of a response packet, gives a congestion notification to have the value representing the congestion state of the network rewritten out of packet headers of the received packet when the bandwidth of each of the flows surpasses a first threshold; and imposes a penalty on the packet when the bandwidth of each of the flows surpasses a second threshold higher than the first threshold.

Further to achieve the object stated above, in an exemplary mode of implementing the invention, the packet search unit drops the packet, rewrites a value indicating the priority level of the packet header in the network or alters the drop priority in the apparatus as a penalty to the packet.

In the bandwidth policing apparatus or the packet relay apparatus having a congestion notifying function, influx of packets into the network surpassing the policed bandwidth can be restricted, and packets surpassing the policed bandwidth for each flow can be prevented from unlimitedly flowing into the later stage of the network than the apparatus.

BRIEF DESCRIPTION OF THE DRAWINGS

FIG. 6 shows an example of configuration of a flow search table pertaining to the first embodiment;

FIG. 7 shows an example of an internal header pertaining to the first embodiment;

FIG. 8 shows an example of queue configuration in a packet transmitting unit pertaining to the first embodiment.

FIG. 9 illustrates queue actions in the packet transmitting unit pertaining to the first embodiment;

FIG. 23 shows one example of configuration of statistics table pertaining to the eighth embodiment.

DETAILED DESCRIPTION OF THE INVENTION

Figure 1:
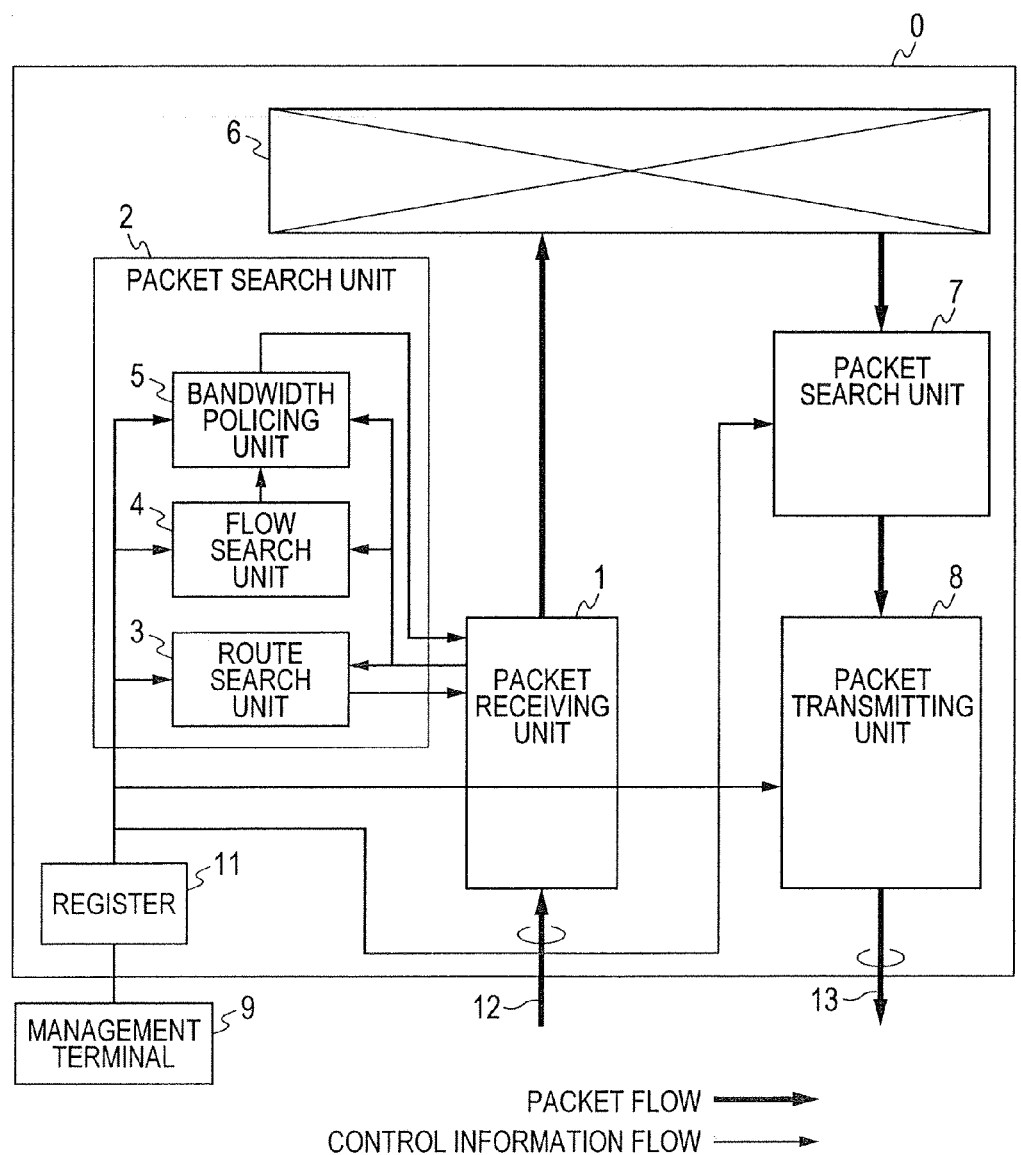
FIG. 1 shows an example of configuration of a packet relay apparatus pertaining to a first embodiment of the invention.

Various embodiments of the present invention will be described below with reference to drawings. In the drawings referenced, the same reference numbers denote respectively the same items. Although packet relay apparatuses will be described as examples of bandwidth policing apparatus equipped with a congestion notification function pertaining to the invention, the invention is not limited to these examples.

In this specification, various functional constituent elements may be referred to as "device", "unit" and "circuit". They are, for instance, respectively a packet search device, a packet search unit, a packet search circuit and so forth.

Embodiment 1

A packet relay apparatus pertaining to the first embodiment will now be described. Although the following description of the packet relay apparatus pertaining to this embodiment supposes the use of TCP/IP packets and ECN for congestion notification, packets of some other transport protocol (Datagram Congestion Control Protocol (DCCP), Stream Control Transmission Protocol (SCTP) or the like) and some other protocol of congestion notification may as well be used.

A packet relay apparatus 0 shown in FIG. 1 is provided with a receiving line 12 for receiving packets, a packet receiving unit 1 for processing reception of packets, a sending line 13 for sending packets, a packet search unit 2 for searching received packets, a packet relay unit 6 for switching packets on the basis of sending line numbers, a packet search unit 7 for received packets, and a packet transmitting unit 8 for reading out a packet and processing its transmission. To add, the packet search unit 2 and the packet search unit 7 are similarly configured with respect to a flow search unit 4 and a bandwidth policing unit 5 except the difference between the receiving and sending sides.

Although FIG. 1 shows only one of the receiving line 12 and the sending line 13, the packet relay apparatus 0 has a plurality each of receiving lines 12 and sending lines 13. The packet receiving unit 1 and the packet search unit 2 connected to it can accommodate a plurality of receiving lines 12. A configuration in which the packet receiving unit 1 and the packet search unit 2 connected to it are provided in a plurality each and each accommodates a mutually different plurality of receiving lines 12 is also acceptable. Similarly, the packet transmitting unit 8 and the packet search unit 7 connected to it can accommodate a plurality of sending lines 13. Further, a configuration in which the packet transmitting unit 8 and the packet search unit 7 connected to it are provided in a plurality each and each accommodates a mutually different plurality of sending lines 13 is also acceptable. Also, a management terminal 9 is connected to the packet relay apparatus 0, and manages and sets in various ways the packet relay apparatus 0 via a register 11.

The packet relay apparatus 0 in FIG. 1 receives a packet from the receiving line 12 connected to the packet receiving unit 1. The packet transmitted from the sender is inputted to the packet receiving unit 1 via the receiving line 12. The packet receiving unit 1 performs functions to temporarily store the inputted packet in a buffer and also to send an internal header including the receiving line number and a packet header to the packet search unit 2.

Figure 2:
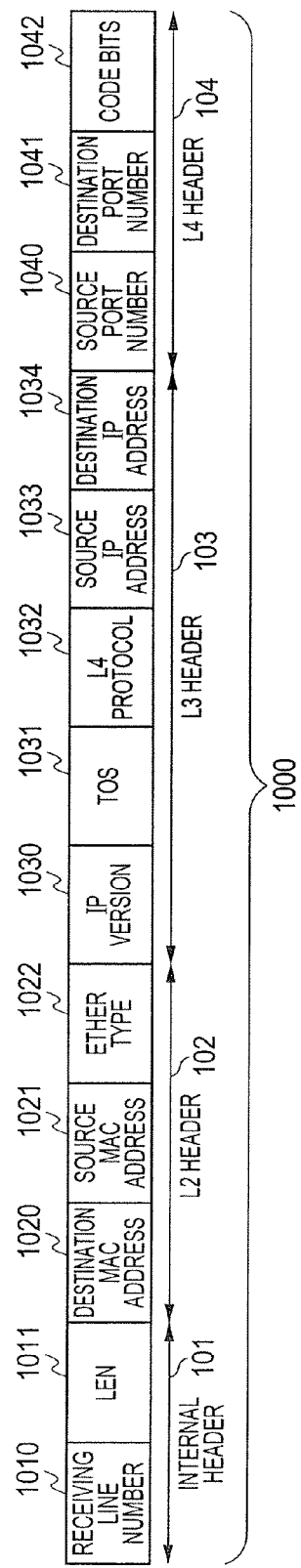
FIG. 2 shows an example of packet header information before determination of destination line and Next Hop IP address in the packet relay apparatus pertaining to the first embodiment.

FIG. 2 shows an example of packet header information at this time. This is one example of packet header information before determination of destination line and Next Hop IP address in the packet relay apparatus. While the packet header information also includes other fields not shown in FIG. 2, only typical fields are described here. A packet header 1000 inputted to the packet receiving unit 1 is provided with an L2 header 102, an L3 header 103 and an L4 header 104.

The L2 header 102 of the received packet comprises a destination media access control (MAC) address 1020, a source MAC address 1021 and an Ether type 1022; the L3 header 103 comprises an IP version 1030, a type of service (TOS) 1031, an L4 protocol 1032, a source IP address 1033 and a destination IP address 1034; the L4 header 104 comprises a source port number 1040, a destination port number 1041 and a code bit 1042; and an internal header 101 added in the packet receiving unit 1 comprises a receiving line number 1010 and a length (LEN) 1011 representing the byte length of the packet.

Figure 3:
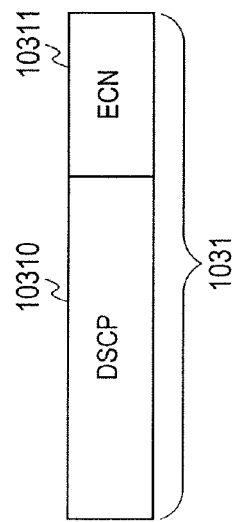
FIG. 3 shows one example of essential parts of an L3 header of packet header information pertaining to the first embodiment.

As shown in FIG. 3, the TOS 1031 in the L3 header 103 comprises a DSCP field 10310 representing the priority of transfer in the network and an ECN field 10311 used for congestion notification by ECN. Incidentally, the definition of (DiffServ code Point) of DSCP is described in "Definition of the Differentiated Services Field (DS Field) in the IPv4 and IPv6 Headers" (http://www.ietf.org/rfc/rfc2474.txt), and the Diffserv model of QOS architecture to which dSCP is applicable is described in "An Architecture for Differentiated Services" (http://www.ietf.org/rfc/rfc2475.txt).

The ECN field 10311 indicates that ECN is supported when the value is "01" or "10" (ECN: ECN-Capable-Transport) and the packet experienced congestion (CE: Congestion Experienced) when the value was "11". The sender supporting ECN sends a packet whose ECN field is set to "01" or "10" and, if congestion has occurred in the packet relay apparatus 0, this field is rewritten to "11" by the packet relay apparatus 0. When congestion is to be notified by bandwidth policing as in this embodiment, it is more efficient to process the rewriting in the bandwidth policing unit 5.

Figure 4:
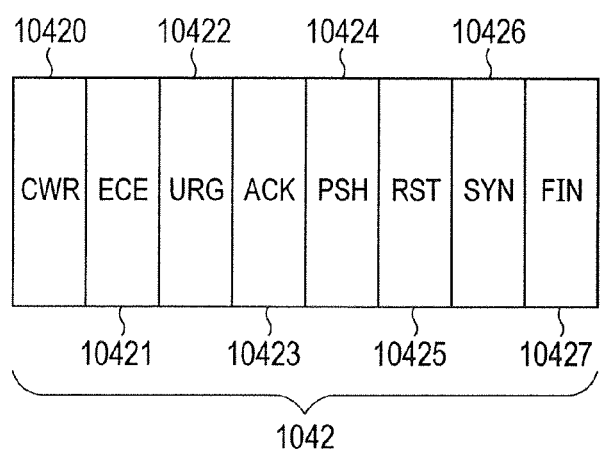
FIG. 4 shows one example of essential parts of an L4 header of packet header information pertaining to the first embodiment.

As shown in FIG. 4, in the code bit 1042, CWR10420 and ECE10421 are added by the expansion of ECN to existing flags URG10422, ACK 10423, PSH10424, RST10425, SYN10426 and FIN10427.

The packet search unit 2 in FIG. 1 is provided with a route search unit 3 that judges a sending line number for identifying a sending line 13, the flow search unit 4 that searches flows and further a bandwidth policing unit 5. The flow search unit 4 of the packet search unit 2 searches flows on the basis of an internal header 101 and a packet header 1000.

Figure 5:
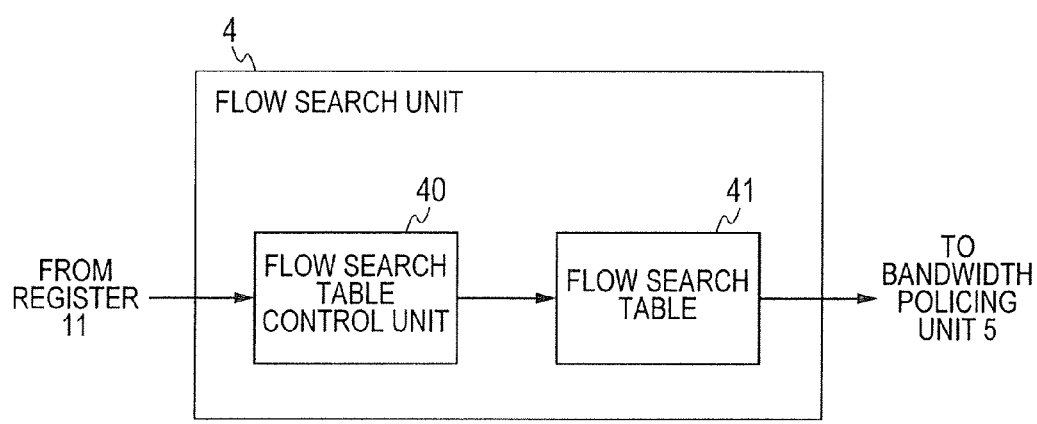
FIG. 5 shows an example of configuration of a flow search unit pertaining to the first embodiment.

FIG. 5 shows an example of configuration of the flow search unit 4. The flow search unit 4 comprises a flow search table control unit 40 and a flow search table 41. The flow identifying conditions set by the operation manager of the bandwidth policing apparatus and sent from the register 11 are set into the flow search table 41 by the flow search table control unit 40.

FIG. 6 shows an example of configuration of the flow search table 41. The flow search table 41 comprises a plurality of flow search entries 410, 411, . . . 417. Each flow search entry comprises various information items including receiving line, source MAC address, destination MAC address, source IP address, destination IP address, TOS, protocol, source port number and destination port number. When a packet is received, a flow search entry of which all the items of the packet header 1000 have identical counterparts is judged, and addresses 410-*a*, 411-*a*, . . . 417-*a* of the identical flow search entry are transmitted to the bandwidth searching unit 5 as the flow number. Each of 410-*a*, 411-*a*, . . . 417-*a* represents the matching one of the addresses 410, 411, . . . 417, and the flow search entries and the address are matched in one-to-one correspondence. Items "d. c." are judged to be identical irrespective of the value.

For each of the searched flows, the bandwidth policing unit 5 processes bandwidth calculation and judging. The details will be given afterwards. The bandwidth policing unit 5 judges whether the result of judgment by bandwidth policing was conformance or violation, and returns to the packet receiving unit 1 the result of judgment comprising, if conformance, DSCP indicating network priority and information indicating priority in the apparatus or, if violation, whether the penalty to be imposed on the packet is packet drop, DSCP in the case of no packet drop and information on priority in the apparatus.

The packet search unit 2 also searches routes on the basis of the internal header 101 and the packet header 1000. For each of the searched routes, the preset transmitting line number of the packet is determined, and the result is returned to the packet receiving unit 1.

As in the internal header 101 an example of which is shown in FIG. 7, the packet receiving unit 1 adds to the internal header 101 a transmitting line number 1012 of the result of judgment by route searching by the packet search unit 2, a bandwidth policing result 1013 indicating whether the result of judgment by bandwidth policing was conformance or violation, a penalty drop 1014 indicating that the penalty to be imposed on the packet was packet drop if it was violation, a delay priority 1015 and a drop priority 1016. These items are transferred as a packet together with the packet header 1000 to the packet relay unit 6.

In Non-Patent Document 4 cited above, when the bucket water quantity CNT surpasses the threshold THR, whether to mark ECN or drop the packet is determined in an antinomy according to whether the apparatus selects ECN or packet drop as the mechanism of congestion notification. Therefore, if ECN marking is selected as the mechanism of congestion notification, the penalty information 1014 indicating packet drop is not needed. This embodiment, however, even if a single bandwidth is policed with one leaky bucket, has both a threshold as the reference for ECN marking to urge bandwidth control on the terminal part and a threshold as the reference for penalty (packet drop/penalty according to DSCP/penalty according to the drop priority 1016) on the network side, and this is one of the configurational differences between a bandwidth policing apparatus mounted with the contents of Non-Patent Document 4 and this embodiment. Even where congestion is to be notified by EON marking, if the penalty is packet drop, the penalty information 1014 of packet drop is required, and this is another configurational difference form a bandwidth policing apparatus mounted with the contents of Non-Patent Document 4.

If the penalty drop 1014 in FIG. 7 instructs packet drop, the packet is not transmitted to the packet relay unit 6 and is dropped instead. If the penalty drop 1014 does not instruct packet drop, it is transferred, on the basis of the transmitting line number 1012 contained in the route search result of the internal header 101, to the packet search unit 7 that accommodates the transmitting line for the packet. If no flow matching the packet is set in the flow search unit of the packet search unit 7, the values of DSCP 10310 of the packet transmitted from the packet search unit 7, the delay priority 1015 and the drop priority 1016 succeed the values of DSCP judged by the packet search unit 2, the delay priority 1015 and the drop priority 1016. If a flow matching the packet is set in the flow search unit of the packet search unit 7, the matching flow is subjected to bandwidth policing, and rewriting to the values of the instructed DSCP and priorities in the apparatus is done. To add, if the result of bandwidth policing by the packet search unit 7 proves to be violation and a penalty of packet drop is instructed, the packet is not transmitted to the packet transmitting unit 8 and is dropped instead. A packet not instructed to be dropped by the packet search unit 7 on the transmitting line side is sent to the packet transmitting unit 8.

As shown in FIG. 8, the packet transmitting unit 8 is provided with a plurality of queues whose priorities are prescribed. Queues indicated by the delay priority 1015 of the packet's internal header 101 are judged by the accumulation queue judging unit 80, and accumulated from queue #1 to queue #4 in the packet transmitting unit 8.

As shown in FIG. 9, each queue has a threshold 86, threshold 87, threshold 88 and threshold 89 matching the drop priority 1016 and, when packets accumulated in a queue reach a threshold, drop priority control is accomplished by dropping such packets. An arbitration unit 85 performs delay priority control by giving priority in transmission to packets in the descending order of priority. When penalty is to be imposed on packets judged by the bandwidth policing unit 5 as having committed bandwidth violation, the value of the drop priority 1016 is set lower than the drop priority of the packet judged to be conforming to the bandwidth. And the packet sent from the packet transmitting unit 8 is sent from the sending line 13 to the network.

Figure 10:
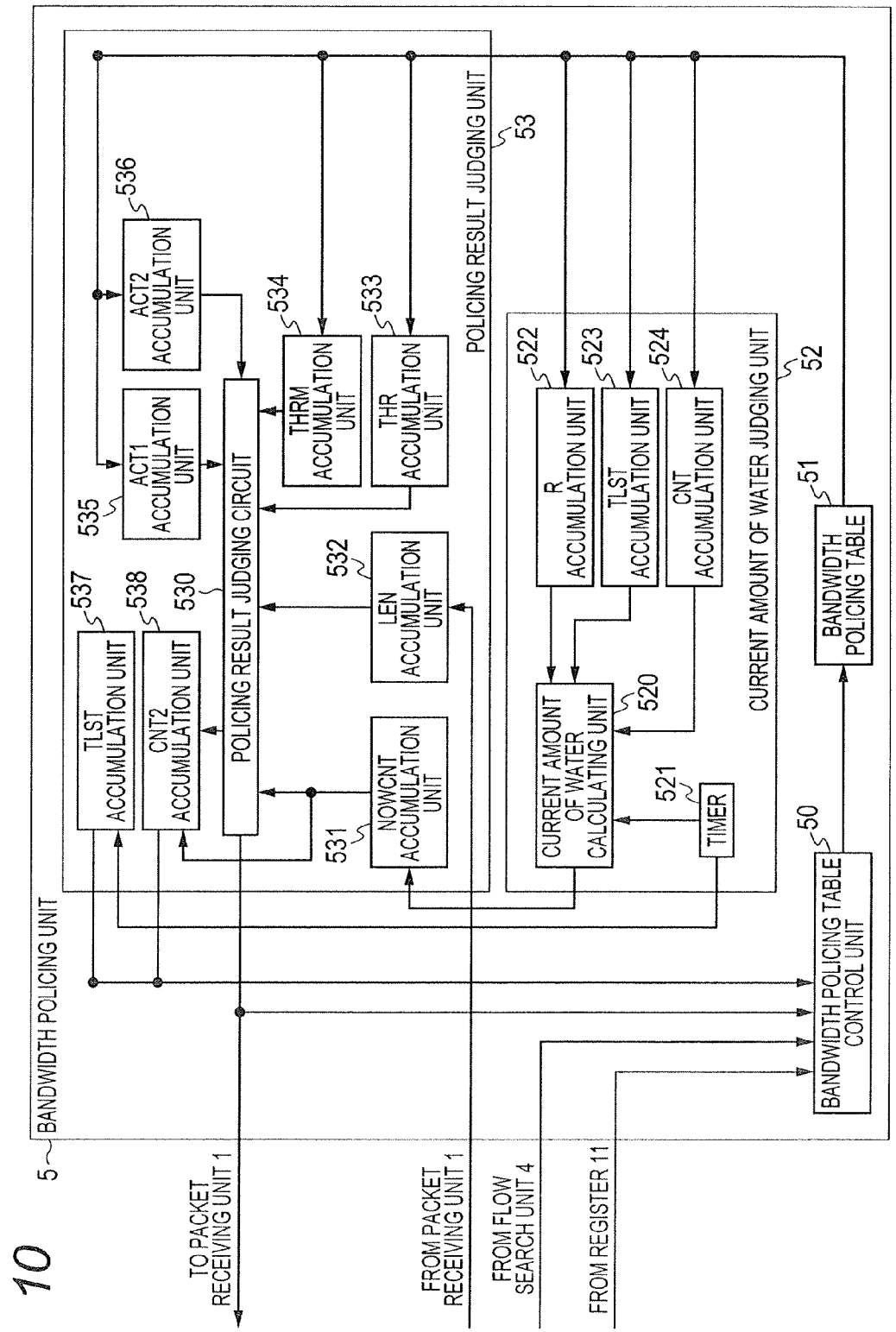
FIG. 10 shows an example of configuration of a bandwidth policing unit pertaining to the first embodiment.

FIG. 10 shows an example of configuration of the bandwidth policing unit 5 in the packet search unit 2 of FIG. 1. In the drawing, the bandwidth policing unit 5 comprises a bandwidth policing table control unit 50, a bandwidth policing table 51, a current amount of water judging unit 52 and a policing result judging unit 53. Conditions set by the operation manager of the bandwidth policing apparatus are set in the bandwidth policing table 51 by the bandwidth policing table control unit 50.

Figure 11:
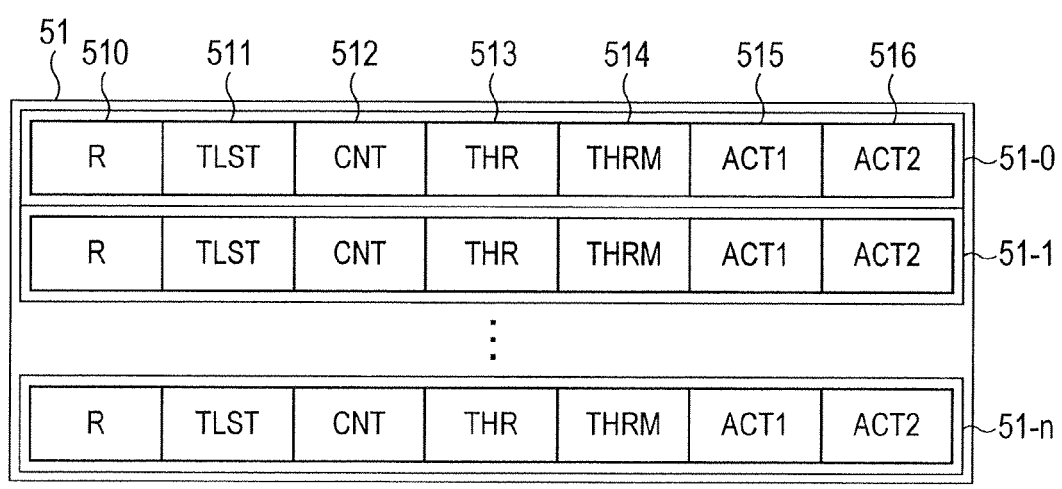
FIG. 11 shows an example of configuration of a bandwidth policing table pertaining to the first embodiment.

FIG. 11 shows an example of configuration of the bandwidth policing table 51. The bandwidth policing table 51 comprises a plurality of bandwidth policing entries 51-0 to 51-$n$. Each bandwidth policing entry comprises a policing bandwidth R510, a previous packet arrival time 511, a bucket water amount 512, a penalty threshold 513, an ECN marking threshold THRM 514, penalty information ACT1 515 applicable in the case of a bucket water amount in excess of the penalty threshold 513, and ECN marking information ACT2 516 applicable in the case of a bucket water amount in excess of the ECN marking threshold THRM 514. In the bandwidth policing apparatus having a congestion notification function, the provision of the penalty threshold 513 and the penalty information ACT1 515 indicating packet drop or penalty according to network priority or drop priority in the apparatus constitutes a configurational feature unique to this embodiment.

When a packet is received, the bandwidth policing table control unit 50 reads out of the bandwidth policing table 51 an address indicating the flow number of the identical flow judged by the flow search unit 4 as the read-out address for the bandwidth policing table 51, and references the bandwidth policing entry matching the identical flow. R510, TLST511, CNT512, THR513, THRM 514, ACT1 515 and ACT2 516 stated in the referenced bandwidth policing entry are respectively accumulated in an R accumulation unit 522, TLST accumulation unit 523, CNT accumulation unit 524, THR accumulation unit 533, THRM accumulation unit 534, ACT1 accumulation unit 535 and ACT2 accumulation unit 536 to be used for judgment on bandwidth policing.

Figure 12:
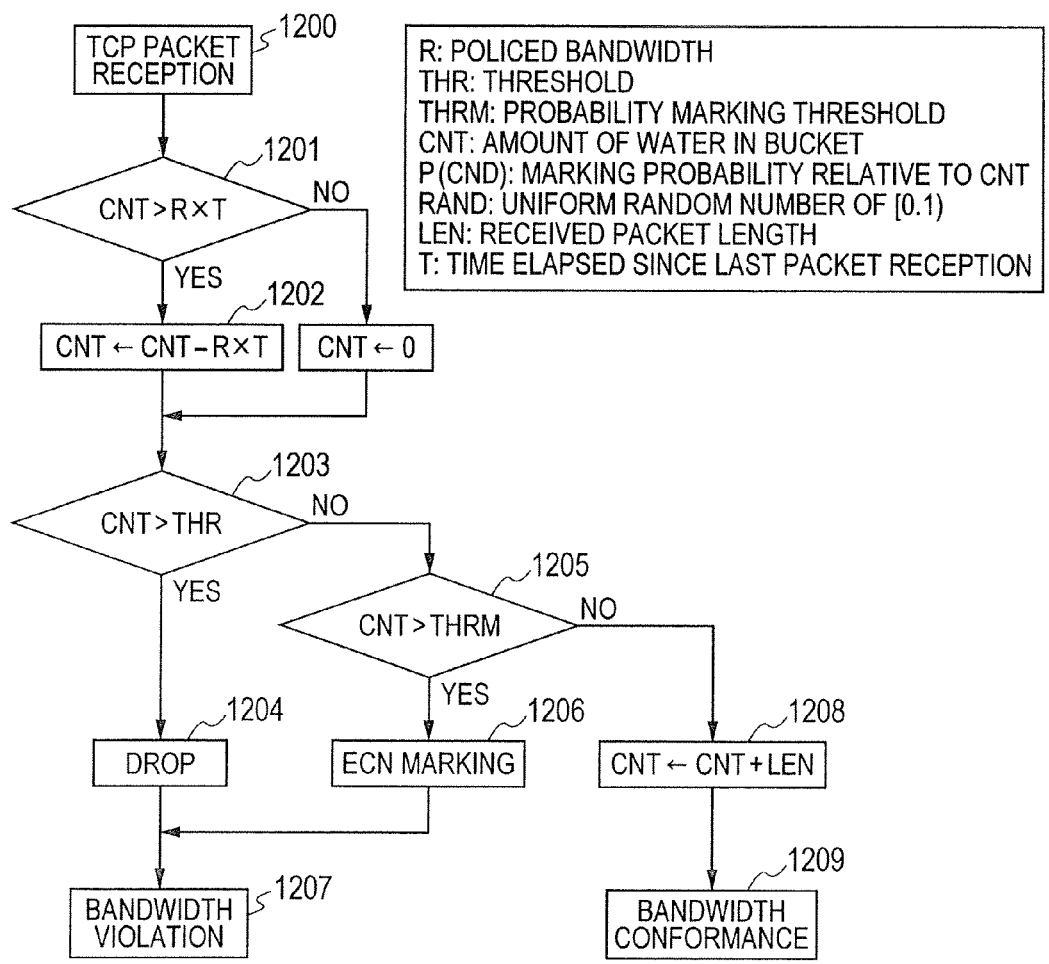
FIG. 12 shows one example of bandwidth policing algorithm pertaining to the first embodiment.

As shown in FIG. 12, the bandwidth policing algorithm of this embodiment is a leaky bucket algorithm, and with this being presupposed the bandwidth policing algorithm of this embodiment, namely the arithmetic operation in the current amount of water judging unit 52 will be described. In the current amount of water judging unit 52, a time elapsed T is calculated by subtracting the accumulated TLST in the TLST accumulation unit 523 from the current time indicated by a timer 521. The relative magnitudes of R×T, the product of R and T accumulated in the R accumulation unit 522 and CNT accumulated in the CNT accumulation unit 524, are compared (step 1201; hereinafter "step" in parentheses will be dispensed with). If R×T is found greater as a result, CNT is reduced to zero. In other cases, R×T is subtracted from CNT. CNT decided upon by the foregoing processing is accumulated in the NOWCNT accumulation unit 531 (1202).

Next, calculation by a policing result judging unit 5 53, which judges whether the result of policing indicates conformance or violation, will be described. In an LEN accumulation unit 532, LEN1011 of the internal header 101 of packets sent from a packet receiving circuit is accumulated. LEN is a value representing the byte length of the packet. A policing result judging circuit 530 compares the relative sizes of CNT accumulated in the NOWCNT accumulation unit 531 and THR accumulated in the THR accumulation unit 533 (1203) and, if CNT is larger, imposes the penalty indicated by ACT1 accumulated in the ACT1 accumulation unit. If, for instance, ACT1 indicates a drop, the packet is dropped (1204); if reducing DSCP priority indicating a fall in the network priority is indicated, DSCP is rewritten in accordance with ACT1; or if reducing the drop priority in the apparatus is indicated, the drop priority in the apparatus is rewritten in accordance with ACT1. In other cases, the relative sizes of CNT and THRM accumulated in the THRM accumulation unit 534 are compared (1205) and, if CNT is larger, the ECN field 10311 of the packet is rewritten in accordance with the value of ECN indicated by the ECN marking information ACT2 (1206).

In these cases, a bandwidth violation is judged (1207), and the bandwidth policing result 1013 is rewritten to a value indicating bandwidth violation. The value of CNT is accumulated in a CNT2 accumulating unit (1210), and the current time indicated by the timer 521 is accumulated in a TLST accumulation unit 537. Then, CNT512 of the bandwidth policy entry of the flow found identical with the packet in the bandwidth policing table 51 is replaced with CNT accumulated in the CNT2 accumulating unit, and TLST511 of the bandwidth policy entry of the flow found identical with the packet is replaced with the timer count accumulated in the TLST accumulation unit.

In other cases, the judgment is bandwidth conformance (1209), and the bandwidth policing result 1013 is rewritten to a value indicating bandwidth conformance. A sum of the addition of LEN to CNT is accumulated in the CNT2 accumulating unit (1210), and the current time indicated by the timer 521 is accumulated in the TLST accumulation unit 537. Then, CNT512 of the bandwidth policy entry of the flow found identical with the packet in the bandwidth policing table 51 is rewritten with CNT accumulated in the CNT2 accumulating unit, and TLST 511 of the bandwidth policy entry of the flow found identical with the packet is replaced with the timer count accumulated in the TLST accumulation unit.

Known algorithms of bandwidth policing include, in addition to the leaky bucket algorithm by the credit system, the Jumping Window algorithm by the window system (see NII Journal No. 3 (November 2001) Feature: Treatises of Information Platform Commentary, "Traffic Control for QoS Guarantee in Communication Networks", Yusheng Ji, National Institute of Informatics (in Japanese) (Non-Patent Document 7)), which may as well be used for bandwidth policing. When this algorithm is used, the relative sizes of an accumulated value B of byte lengths of packets sent from the packet receiving unit 1 for every time window W and the number of bytes W×R permissible during the time window 2 are compared; a similar penalty is processed to that in the case of leaky bucket algorithm under the principle that, if B is larger, the judgment is bandwidth violation and in other cases the judgment is bandwidth conformance.

Although the foregoing description supposed a configuration in which the bandwidth policing unit 5 provided in the receiving packet search unit 2 performs bandwidth policing on the receiving side, the packet search unit 7 on the transmitting side can similarly be equipped with a bandwidth policing unit 5, enabling the configuration of this embodiment to be applied to bandwidth policing on the transmitting side as well. The same applies to all other embodiments to be described below.

Embodiment 2

Figure 13:
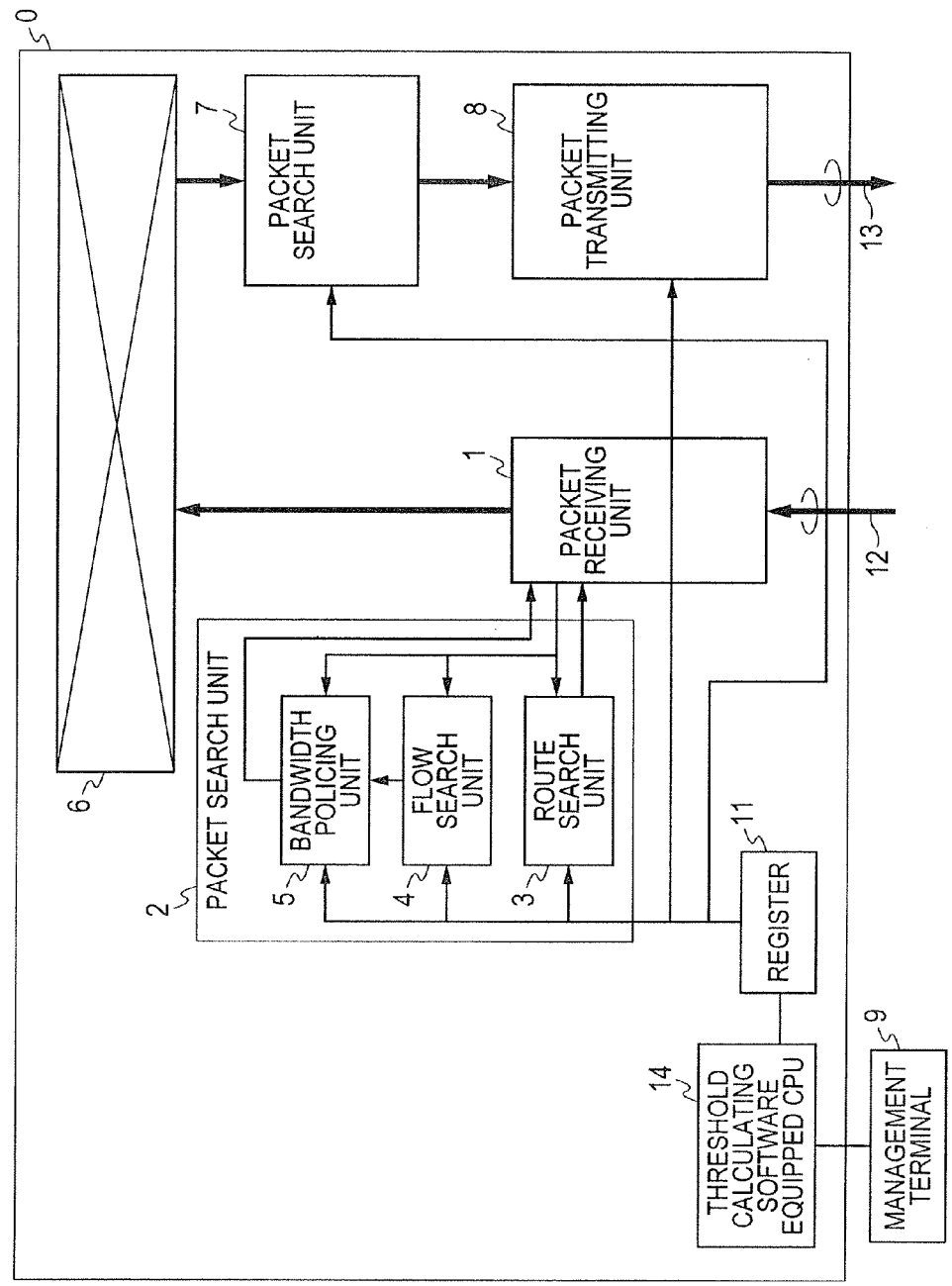
FIG. 13 shows one example of configuration of packet relay apparatus pertaining to a second embodiment.

Now, as a second embodiment of the invention, a packet relay apparatus mounted with threshold calculating software will be described with reference to FIG. 13. A bandwidth policing apparatus pertaining to the second embodiment can automatically set either one or both of a first threshold and a second threshold with the difference between the first threshold and the second threshold being used as a function of the round trip time of a packet.

For this reason, the packet relay apparatus of the second embodiment is provided with a threshold calculating software equipping CPU 14 in addition to the configuration of the first embodiment. The threshold calculating software equipping CPU 14 here is a usual central processing unit (CPU) capable of implementing a program that is threshold calculating software. Other aspects of the configuration are similar to what are shown in FIG. 1 regarding the first embodiment, and the configuration of the bandwidth policing unit 5 is similar to what is shown in FIG. 10.

In this embodiment, information necessary for threshold calculation regarding each flow is acquired through the management terminal 9 or the register 11, and the threshold calculating software equipping CPU 14 calculates a threshold on that basis, and causes the bandwidth policing table control unit 50 through the register 11 to set the threshold in THR513 and THR514 in FIG. 11, which are flow-by-flow bandwidth policing entries in the bandwidth policing table 50. Either one or both of THR513 and THR514 are automatically set with the difference between THR513 and THR514 being used as a function of the round trip time (RTR) of a packet.

First, the case of automatically setting both will be described. THRM514 is supposed to be:

$$THRM = (C/4+1)8*1500\ bytes + 3C/4*1500\ bytes$$

$$R/8 = 3C/4*1500\ bytes/RTT$$

according to Non-Patent Document 6, where the length of the packet is supposed to be 1500 bytes.

THR513 is supposed to be:

$$THR = THRM + R \times RTT$$

as permitting bursts equivalent to the policed bandwidth during RTT that corresponds to a delay until feedback by the congestion notifying function is obtained.

When either one is to be automatically set, for instance THRM514 is set by the manager of the bandwidth policing apparatus entering an input from the management terminal 9. THR is determined by:

$$THR = THRM + R \times RTT$$

Performing these calculations requires RTT of the flow subject to bandwidth policing. One method of figuring it out is to input from the management terminal 9 an RTT value searched for by the manager of the bandwidth policing apparatus in advance.

Another method is to autonomously generate a ping packet in the bandwidth policing apparatus at the time of setting a bandwidth policing entry, measure RTT according to the reply to it and calculate a threshold on the basis of the measured RTT. In this case, inputting of the bandwidth policing entry from the management terminal 9 triggers generation of the ping packet by the threshold calculating software equipping CPU 14, and the ping packet is sent via the register 11 from the packet transmitting unit 8 to both the receiver and the sender. When the packet receiving unit 1 receives a response packet to this ping packet, it is sent to the threshold calculating software equipping CPU 14 and the value of RTT is obtained. As the value of RTT, the sum of RTT from the bandwidth policing apparatus to the sender and RTT from the bandwidth policing apparatus to the receiver is used. Then, the threshold calculating software equipping CPU 14 calculates the threshold on the basis of the RTT obtained.

Further, it is also possible in this embodiment to realize threshold setting following dynamic RTT variations by repeating periodic ping packet-based RTT measuring and measured value-based threshold calculation. To add, as stated above, the packet search unit 7 on the transmitting side can similarly be equipped with a bandwidth policing unit 5, enabling this embodiment to be applied to bandwidth policing on the transmitting side as well.

Embodiment 3

A packet relay apparatus pertaining to a third embodiment will now be described with reference to drawings. The bandwidth policing apparatus of the third embodiment has a configuration in which, when the bandwidth of each flow surpasses a first threshold, a value indicating the state of congestion of the network, out of the packet header of a packet received by the packet relay apparatus, is rewritten with a probability predetermined for every value of bucket water amount.

Thus, the bandwidth policing apparatus of the third embodiment, when the bandwidth of each flow surpasses THRM514, rewrites the value of the ECN field 10311 indicating the state of congestion of the network, out of the packet header of the packet received by the apparatus, to a value indicating CE with the probability predetermined for every value of bucket water amount CNT.

Figure 14:
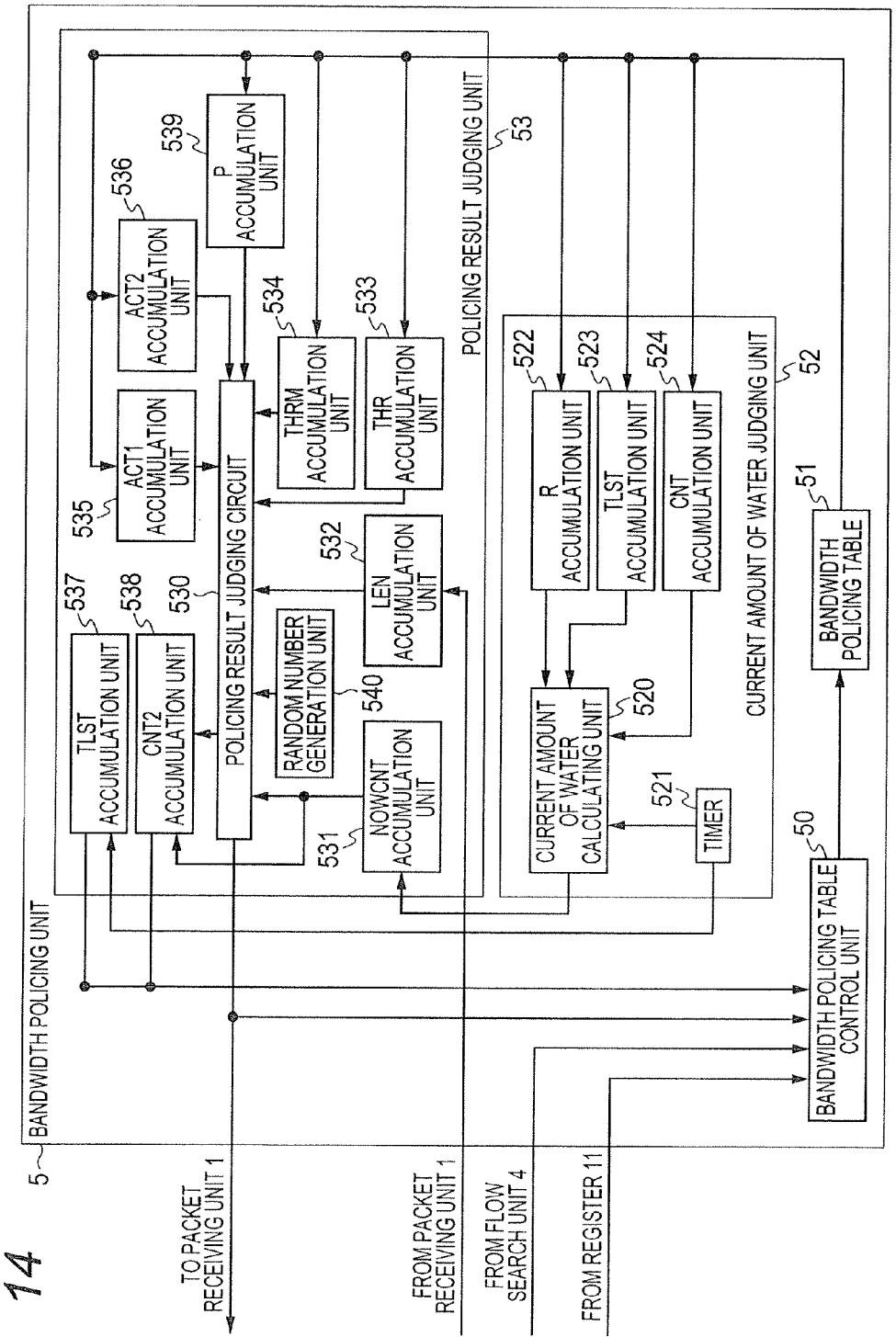
FIG. 14 shows one example of configuration of bandwidth policing unit pertaining to a third embodiment.
Figure 15:
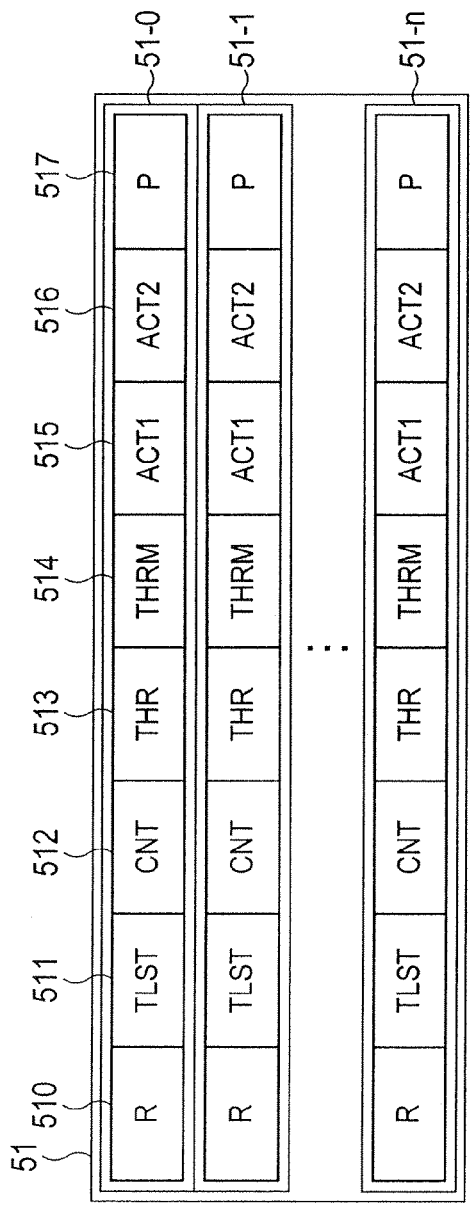
FIG. 15 shows one example of configuration of bandwidth policing table pertaining to the third embodiment.

For this reason, as shown in FIG. 14, the bandwidth policing apparatus 5 of this embodiment is equipped with a random number generation unit 540 and a P accumulation unit 539 in addition to the bandwidth policing unit of the first embodiment. Further, the bandwidth policing table 51 has a field P517 for setting the probability as shown in FIG. 15. As the system for realizing probability control of the third embodiment, one of setting the probability for each bucket threshold is conceivable, but in the system described here, based on the presupposition that the probability for the bucket threshold linearly rises, uses P as the probability at THR and 0 as that at THRM. Then, such a packaging that the probability rises stepwise by P/4 at every (THR−THRM)/4 starting from THRM is conceived. Although the description of the third embodiment supposed the number of steps to be 4, the number of steps can be any desired value. When the bucket water amount surpasses THR, the packet is dropped.

Figure 16:
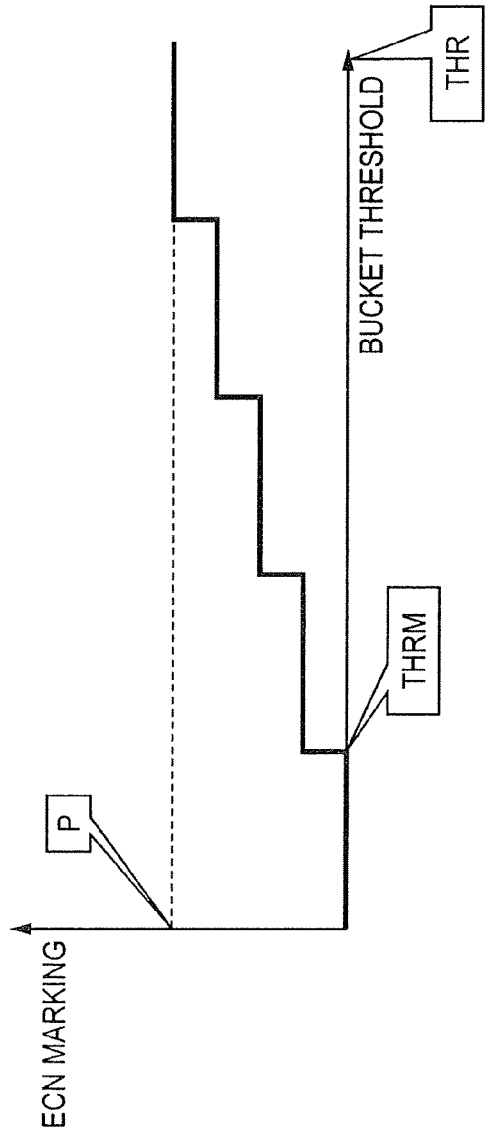
FIG. 16 illustrates probability control pertaining to the third embodiment.
Figure 17:
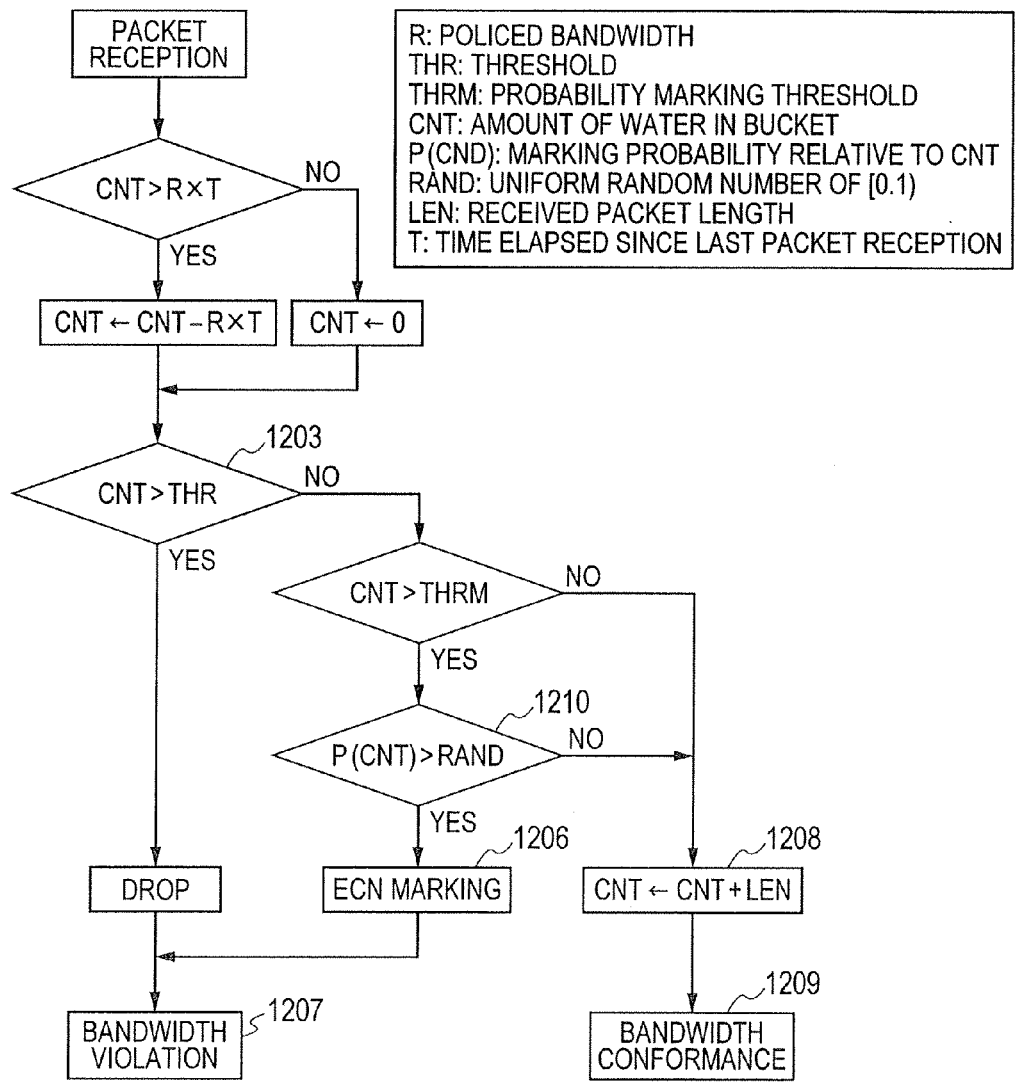
FIG. 17 shows one example of bandwidth policing algorithm pertaining to the third embodiment.

The probability control in this embodiment is schematically illustrated in FIG. 16. Also, the algorithm of this embodiment is shown in FIG. 17, with reference to which only the differences from the first embodiment will be described. In the third embodiment, when referencing bandwidth policing entries in connection with a packet input, P517 is accumulated in the accumulation unit 539. The policing result judging circuit 530 processes judgment in accordance with a flow in which P(CNT)=P/4 in FIG. 17 when the CNT received from the NOWCNT accumulation unit 531 is THRM≤CNT<THRM+(THR−THRM)/4, P(CNT)=P/2 in FIG. 17 when the same is THRM+(THR−THRM)/4≤CNT<THRM+(THR−THRM)/2, P(CNT)=3P/4 in FIG. 17 when the same is THRM+(THR−THRM)/2≤CNT<THRM+3(THR−THRM)/4, and P(CNT)=P in FIG. 17 when the same is THRM+3(THR−THRM)/4≤CNT<THR.

And when judgment of P(CNR)<RAND (uniform random number of [0, 1]) is processed, the value of the uniform random number RAND received from the random number generation unit 540 is compared with P(CNT) in terms or relative size (1210) and, if P(CNT) is larger, the ECN field 10311 of the packet is rewritten in accordance with the ECN value indicated by ECN marking information ACT1 (1206). In this case bandwidth violation is judged, and the bandwidth policing result 1013 is rewritten to a value indicating bandwidth violation (1207). In other cases, bandwidth conformance (1209) is judged, and processing similar to that in the first embodiment is accomplished.

Embodiment 4

A packet relay apparatus of a fourth embodiment will be described with reference to drawings. In a bandwidth policing apparatus of this embodiment, the sender of packets constituting a detected flow has no function to respond to the congestion notifying function but is equipped with a congestion avoidance function.

Thus, the bandwidth policing apparatus of the fourth embodiment, where the sender of packets constituting a detected flow has no function to respond to the congestion notifying function but is equipped with a congestion avoidance function, in the case of a TCP packet which does not support EON for instance, the bandwidth policing apparatus of the third embodiment is further augmented with processing to drop a packet with a probability predetermined for every value of bucket water amount when the bandwidth for each flow surpasses THRM514 and processing to drop a packet when the bandwidth for each flow surpasses THRM513.

Figure 18:
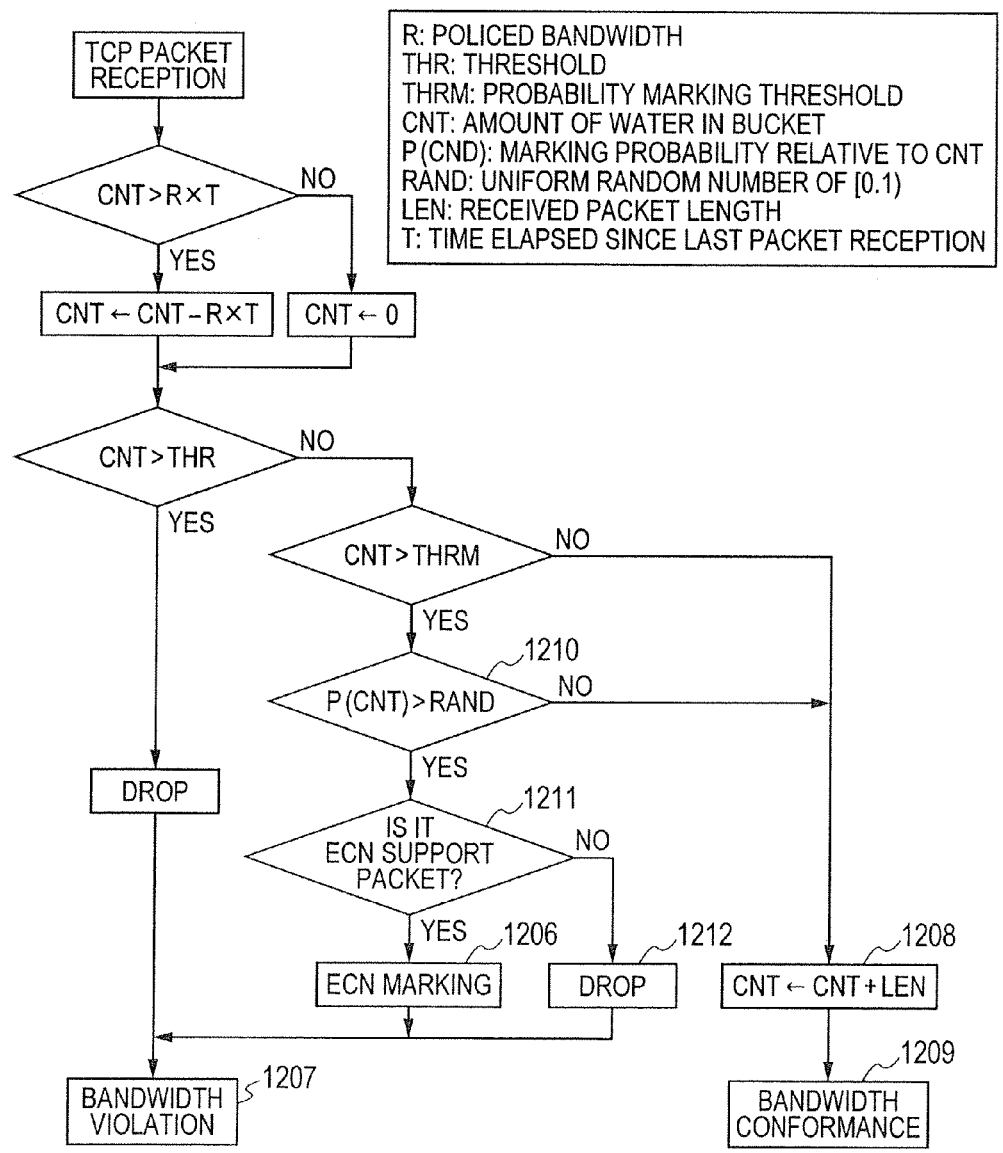
FIG. 18 shows one example of bandwidth policing algorithm pertaining to a fourth embodiment.

For this reason, in the policing result judging circuit 530 of the bandwidth policing apparatus of the fourth embodiment, after the result of judgment of P(CNT)>RAND (1210) in the algorithm of FIG. 17 turns out to be YES, a flow to judge whether the packet supports ECN or not (1211) is added as shown in FIG. 18. Whether or not the packet supports ECN can be judged, as described with respect to the first embodiment, from the value of the ECN field 10311 of the packet; if the ECN field 10311 is "01", "10" and "11", it can be judged as an ECN support packet or if it is "00", it can be judged as a packet that does not support ECN. If it is an ECN support packet, the value of the ECN field 10311 is rewritten to a value indicating CE with a probability predetermined for every value of bucket water amount CNT (1206) as in the third embodiment. If it is a packet not supporting ECN, the packet is dropped with a probability predetermined for every value of bucket water amount CNT (1212) instead of processing to rewrite the ECN field 10311. The probability of packet drop may have the same value as or a different value from the probability of rewriting the ECN field.

Embodiment 5

A packet relay apparatus of a fifth embodiment will be described with reference to a drawing. In a bandwidth policing apparatus of this embodiment, the sender of packets constituting a detected flow has neither a function to respond to the congestion notifying function nor a congestion avoidance function.

Thus, the bandwidth policing apparatus of the fifth embodiment, where the sender of packets constituting a detected flow has neither a function to respond to the congestion notifying function nor a congestion avoidance function, the bandwidth policing apparatus of the fourth embodiment is further augmented with processing to drop a packet when the bandwidth for each flow surpasses THR513 where the packet is a UDP packet.

Figure 19:
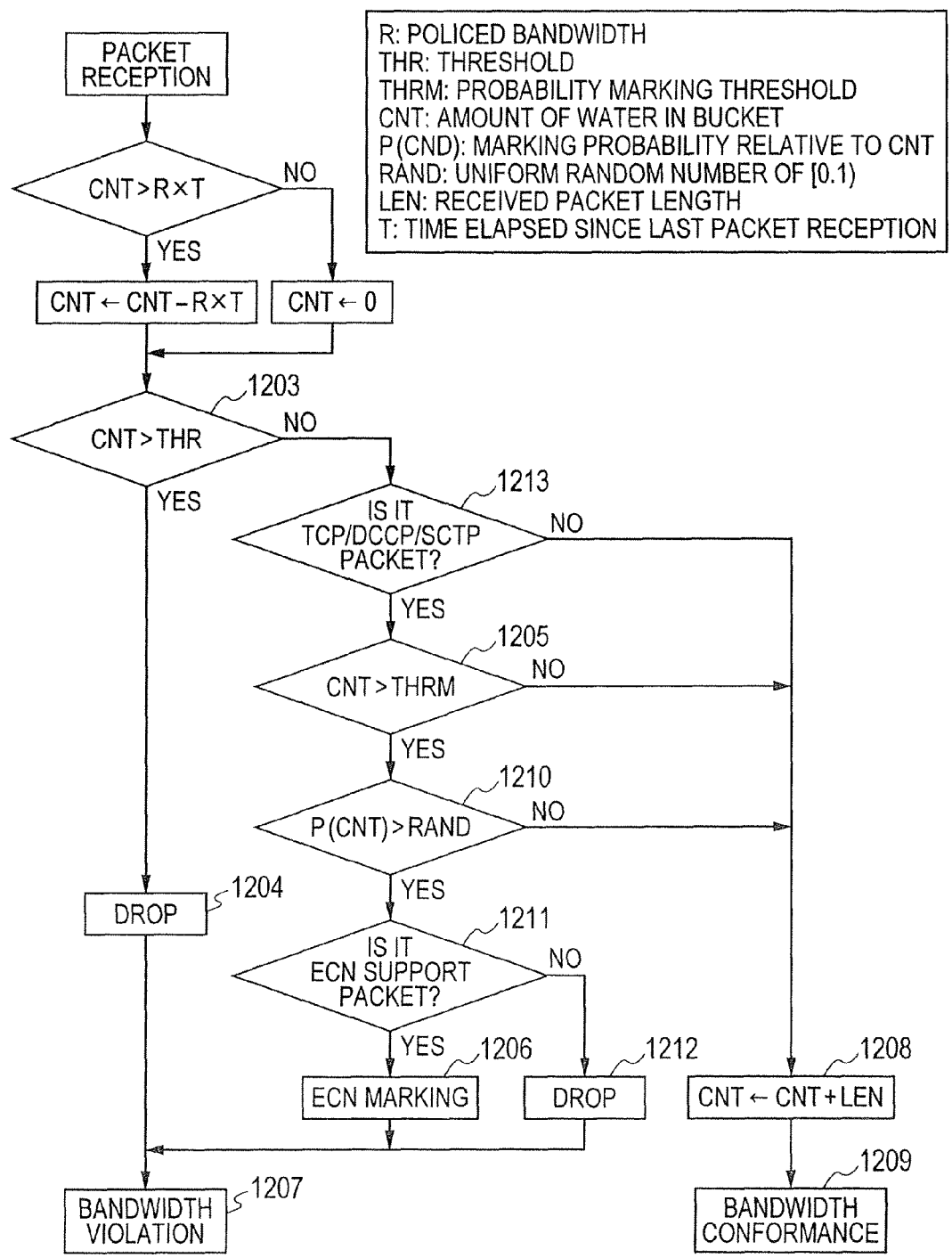
FIG. 19 shows one example of bandwidth policing algorithm pertaining to a fifth embodiment.

For this reason, in the fifth embodiment, after the result of judgment of CNT>THR in the algorithm of FIG. 18 turns out to be NO, a flow to judge whether the packet is a TCP/DCCP/SCTP packet or not (1213) is added as shown in FIG. 19. Whether the packet is a TCP/DCCP/SCTP packet or not can be judged from the value of the protocol field of the packet. If it is a TCP/DCCP/SCTP packet, a judgment flow of CNT>THRM is started (1205) as in the fourth embodiment. If it is not a TCP/DCCP/SCTP packet, the judgment is bandwidth conformance instead of starting the judgment flow of CNT>THRM unlike in the fourth embodiment, and the bandwidth policing result 1013 is rewritten to a value indicating bandwidth conformance as in the first embodiment (1209).

Thus, the sum of adding LEN to CNT is accumulated in a CNT2 accumulation unit 538 (1208), and the current time indicated by the timer 521 is accumulated in the TLST accumulation unit 537. Then, CNT512 of the bandwidth policy entry of the flow found identical with the packet in the bandwidth policing table 51 is replaced with CNT accumulated in the CNT2 accumulating unit 538, and TLST511 of the bandwidth policy entry of the flow found identical with the packet is replaced with the timer count accumulated in the TLST accumulation unit 537.

Embodiment 6

Now, a packet relay apparatus of a sixth embodiment will be described. A bandwidth policing apparatus of this embodiment has a bandwidth of a flow comprising packets whose sender is a terminal provided with a function to respond to the congestion notification and a bandwidth of a flow comprising packets whose sender is a terminal provided with no function to respond to the congestion but provided with a terminal having a congestion avoidance function as the sender.

Thus, the bandwidth policing apparatus of the sixth embodiment independently polices the bandwidth of a flow comprising packets whose sender is a terminal provided with a function to respond to the congestion notification and the bandwidth of a flow comprising packets whose sender is a terminal provided with no function to respond to the congestion notification but provided with a function to avoid congestion.

For this reason, in the flow search table 41 of the bandwidth policing apparatus of the sixth embodiment, a flow comprising packets whose sender is a terminal provided with a function to respond to the congestion notification and a flow comprising packets whose sender is a terminal provided with no function to respond to the congestion notification but provided with a function to avoid congestion are set as different flow search entries. The terminal with the function to avoid congestion can be identified by a protocol number. If the protocol number is 6, it is TCP and accordingly has a congestion avoidance function. The presence or absence of the function to respond to the congestion notification can be distinguished by the value of the ECN field. If the value of the ECN field is 00, it means the absence of the function to respond to the congestion notification.

In a flow search entry matching a flow comprising packets whose sender is a terminal provided with a function to respond to the congestion notification, conditions that the protocol number is 6 and the value of the ECN field is other than 00 are set. In another flow search entry matching a flow comprising packets whose sender is a terminal provided with no function to respond to the congestion notification but provided with a function to avoid congestion, conditions that the protocol number is 6 and the value of the ECN field is 00 are set.

For instance, if the flow search table 41 is configured of a search-dedicated memory known as a content addressable memory (CAM) (see IEEE JOURNAL OF SOLID-STATE CIRCUITS, Vol. 41, No. 3, March 2006, "Content-Addressable Memory (CAM) Circuits and Architectures: A Tutorial and Survey" Kostas Pagiamtzis, Student Member, IEE, and Ali Sheikholeslami, Senior Member, IEEE (http://static/pagiamtzis.com/publications/pagiamtzis-jssc2006.pdf) (Non-Patent Document 8)), inputting a packet header 1000 to the flow search table 41 configured of a CAM causes the address of a flow search entry identical with the packet header 100 to be outputted. In this case, in the flow search entry matching a flow comprising packets whose sender is a terminal provided with no function to respond to the congestion notification, the conditions that the protocol number is 6 and the value of the ECN field is 00 are set as the flow search entry on the CAM. And in the flow search entry matching a flow comprising packets whose sender is a terminal provided with a function to respond to the congestion notification and provided with a function to avoid congestion, a flow search entry with conditions that the protocol number is 6 and the value of the ECN field is d.c. is set at an address one level below the flow search entry matching a flow comprising packets whose sender is a terminal provided with a function to respond to the congestion notification. The setting d.c. is characteristic of a ternary CAM indicated in Non-Patent Document 8, and the condition set to d.c. is judged to be identical irrespective of whether it is 0 or 1. Therefore, the TCP packet whose ECN field is 00 is identical with a packet whose sender is a terminal provided with no function to respond to the congestion notification. Other TCP packets, namely TCP packets whose ECN field is 01, 10 or 11 identical with a packet whose sender is a terminal provided with a function to respond to the congestion notification and provided with a function to avoid congestion.

As described above, in this embodiment, a flow comprising packets whose sender is a terminal provided with a function to respond to the congestion notification and a flow comprising packets whose sender is a terminal provided with no function to respond to the congestion notification but provided with a function to avoid congestion can be set as flow search entries with mutually different addresses, and each flow can be subjected to bandwidth policing using different bandwidth policing entries. Thus, the bandwidth of a flow comprising packets whose sender is a terminal provided with a function to respond to the congestion notification and the bandwidth of a flow comprising packets whose sender is a terminal provided with no function to respond to the congestion notification but provided with a function to avoid congestion can be independently policed.

Furthermore, to a flow comprising packets whose sender is a terminal provided with no function to respond to the congestion notification but provided with a function to avoid congestion, an algorithm in which penalty processing of EON marking in the algorithm illustrated in FIG. 17 and described with respect to the third embodiment is altered to dropping can be applied. Therefore, ACT2 of the bandwidth policing entry is set to a value indicating a drop. In this way, a bandwidth policing apparatus having a feature that, where the sender of packets constituting a detected flow has no function to respond to the congestion notifying function but is equipped with a congestion avoidance function, when the bandwidth of each flow surpasses the first threshold, packets are dropped with a probability predetermined for each value of bucket water amount and, when the bandwidth of each flow surpasses the second threshold, packets are dropped can be realized.

Embodiment 7

Now, a packet relay apparatus of a seventh embodiment will be described. A bandwidth policing apparatus of this embodiment polices a bandwidth of a flow comprising packets whose sender is a terminal provided with a function to respond to the congestion notification and a bandwidth of a flow comprising packets whose sender is a terminal provided with neither a function to respond to the congestion notification nor a terminal having a congestion avoidance function as the sender.

Thus, the bandwidth policing apparatus of the seventh embodiment independently polices the bandwidth of a flow comprising packets whose sender is a terminal provided with a function to respond to the congestion notification and the bandwidth of a flow comprising packets whose sender is a terminal provided with neither a function to respond to the congestion notification nor a function to avoid congestion.

For this reason, in the flow search table 41 of the bandwidth policing apparatus of the seventh embodiment, a flow comprising packets whose sender is a terminal provided with a function to respond to the congestion notification and a flow comprising packets whose sender is a terminal provided with neither a function to respond to the congestion notification nor a function to avoid congestion are set as different flow search entries. The terminal with no function to avoid congestion can be identified by a protocol number. If the protocol number is 17, the user datagram protocol (UDP) is (RFC768, "User Datagram Protocol", http://www.ietf.org/rfc/rfc0768.txt), and accordingly no congestion avoidance function is provided.

In a flow search entry matching a flow comprising packets whose sender is a terminal provided with neither a function to respond to the congestion notification nor a function to avoid congestion, the condition that the protocol number is 17 is set.

For instance, in the configuration of the flow search table 41 of the sixth embodiment, a flow search entry whose protocol number is 17 is set at an address one level below the flow search entry matching a flow comprising packets whose sender is a terminal provided with no function to respond to the congestion notifying function but equipped with a congestion avoidance function.

As described above, a flow comprising packets whose sender is a terminal provided with a function to respond to the congestion notification and a flow comprising packets whose sender is a terminal provided with neither a function to respond to the congestion notification nor a function to avoid congestion can be set as flow search entries with mutually different addresses, and each flow can be subjected to bandwidth policing using different bandwidth policing entries. Thus, the bandwidth of a flow comprising packets whose sender is a terminal provided with a function to respond to the congestion notification and the bandwidth of a flow comprising packets whose sender is a terminal provided with neither a function to respond to the congestion notification nor a function to avoid congestion can be independently policed.

Furthermore, to a flow comprising packets whose sender is a terminal provided with neither a function to respond to the congestion notification nor a function to avoid congestion, the algorithm of FIG. 18 can be applied. Since the UDP packed is not a TCP/DCCP/SCTP packet, no judgment to compare the relative sizes of THRM and CNT is processed. In this way, a bandwidth policing apparatus having a feature that, where the sender of packets constituting a detected flow has neither a function to respond to the congestion notification nor a congestion avoidance function, when the bandwidth of each flow surpasses the second threshold, packets are dropped can be realized.

Embodiment 8

Figure 20:
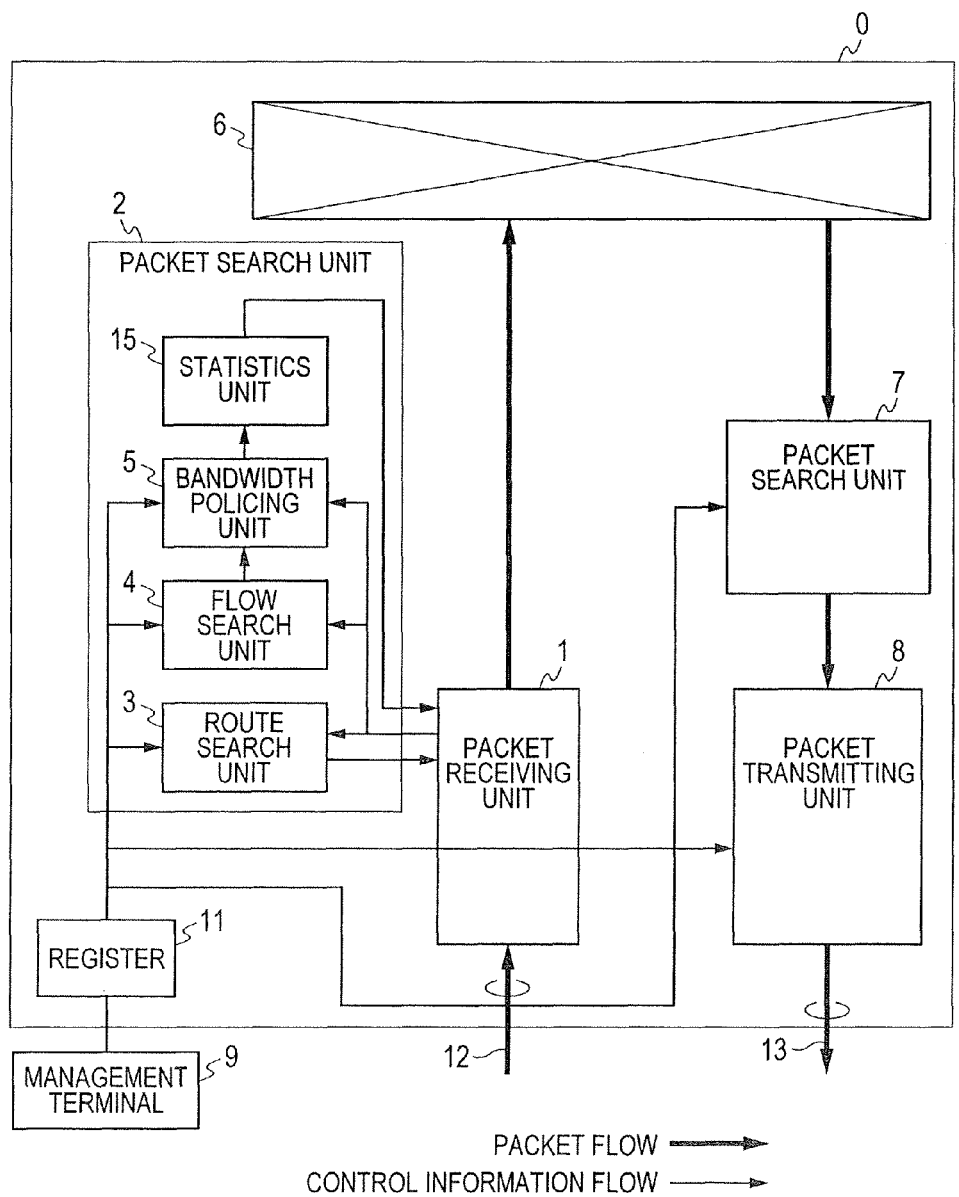
FIG. 20 shows one example of configuration of packet relay apparatus pertaining to an eighth embodiment.
Figure 21:
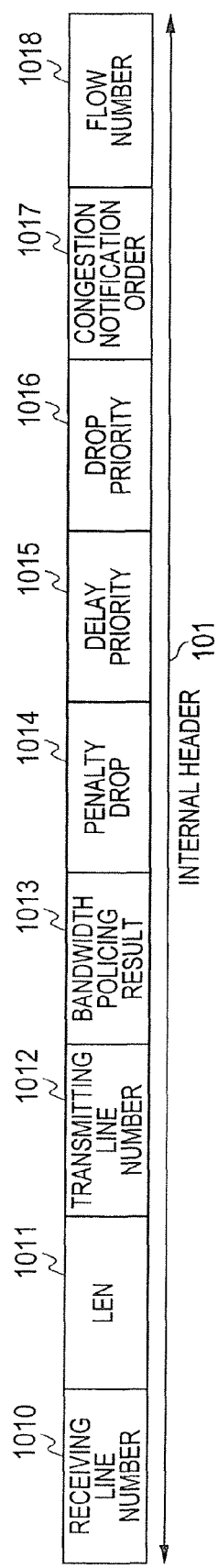
FIG. 21 shows one example of internal header pertaining to the eighth embodiment.
Figure 22:
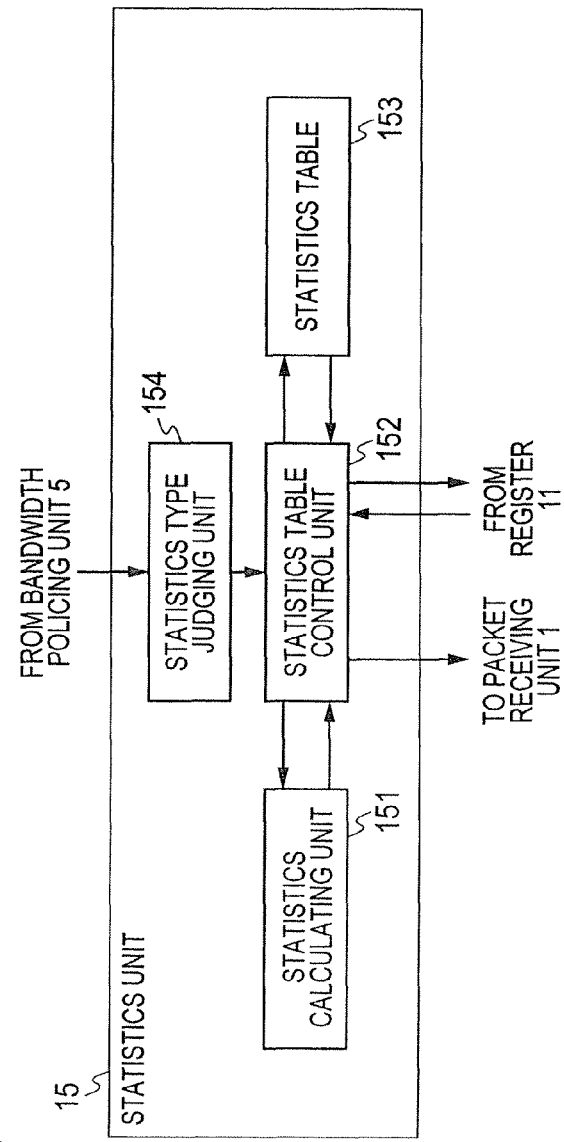
FIG. 22 shows one example of configuration of statistics unit pertaining to the eighth embodiment.

Now, a packet relay apparatus of an eighth embodiment will be described with reference to FIG. 20 through FIG. 23. FIG. 20 shows one example of configuration of a bandwidth policing apparatus pertaining to this embodiment; FIG. 21, one example of internal header; FIG. 22, one example of configuration of statistics unit added to the packet search unit; and FIG. 23, one example of statistics table.

The bandwidth policing apparatus of this embodiment picks up statistics of at least either of the number of packets and the number of bytes having given a congestion notification, statistics of at least either of the number of packets and the number of bytes of packets having undergone packet drop, rewriting of any value indicating the priority in the network or alteration of the priority in the apparatus, and statistics of at least either of the number of packets and the number of bytes of packets on which none of the penalties mentioned above has been imposed. For this reason, the bandwidth policing apparatus of the eighth embodiment is provided with a statistics unit 15 in the packet search unit 2.

The flow of statistics pickup will be described with focus on differences from the first embodiment. If the bandwidth policing unit 5 subjects packets to bandwidth policing and a congestion notification is given, information on a congestion notification order 1017 indicating that a congestion notification has been ordered by the policing result judging circuit 530 of the bandwidth policing unit 5, information on the bandwidth policing result 1013 indicating whether or not the policing result is conformance and a flow number 1018 judged by the flow search unit 4 and used for referencing bandwidth policing entries by the bandwidth policing unit 5 are added as shown in FIG. 21 to the internal header 101, which is then transmitted to the statistics unit 15.

As shown in FIG. 22, the statistics unit 15 comprises a statistics calculating unit 151, a statistics table control unit 152, a statistics table 153 and a statistics type judging unit 154. A packet sent to the statistics unit 15 first undergoes judgment of the statistics type to be picked up from the packet by the statistics type judging unit 154. If the bandwidth policing result 1013 regarding the internal header of the packet indicates conformance, statistics as a conforming packet are picked up. If the bandwidth policing result is violation and the congestion notification order is "1", statistics as a violating marking packet are picked up. If the bandwidth policing result 1013 is violation and the congestion notification order is "0", statistics as a violating drop packet are picked up. Incidentally, disposition of a packet as being subject to violation drop is made if the penalty against surpassing of the bucket water amount CNT surpasses THR is packet drop; if the penalty is lowering the priority level in the network, the statistics are taken as a violating network priority-lowered packet; and if the penalty is lowering the priority in the apparatus, the statistics are taken as a violating in-apparatus priority-lowered packet.

When the type of statistics to be picked up is judged by the statistics type judging unit 154, the statistics table control unit 152 references the statistics table 153 shown in FIG. 23 on the basis of a flow number 1018, and reads out a statistics entry matching the flow whose statistics are to be picked up. The statistics table 153 has a plurality of statistics entries 1530-0, 1530-1 . . . 1530-$n$, and each statistics entry comprises a conforming packet number 1531, a conforming byte number 1532, a violating marking packet number 1533, a violating marking byte number 1534, a violating drop packet number 1535 and a violating byte packet number 1536. If the type of statistics is conforming packet, statistics of the conforming packet number 1531 and the conforming byte number 1532 are picked up; if the type of statistics is violating marking packet, statistics of the violating marking packet number 1533 and the violating marking byte number 1534 are picked up; or if the type of statistics is violating drop, statistics of the violating drop packet number 1535 and the violating drop byte number 1536 are picked up.

Calculation of statistics is processed by the statistics calculating unit 151. When information on the number of packets and the number of bytes that have been read out is received from the statistics table control unit 152, 1 is added to the number of packets and LEN1011 of the internal header 101 is added to the number of bytes, both being transmitted to the statistics table control unit 152.

The statistics table control unit writes the information on the number of packets and the number of bytes that have been read out is received from the statistics calculating unit 151 so writes into the statistics table 153 on the basis of the flow number 1018 as to be set in the field of the matching statistics table, and thereby completes the processing to pick up statistics.

By reading out of the register 11 the statistics table 153 as required, statistical information on the number of conforming packets, that of conforming bytes, that of violating marking packets, that of violating marking bytes, that of violating drop packets and that of violating drop bytes can be obtained.

The present invention is not limited to the embodiments described above, but includes various modifications. For instance, the foregoing embodiments were described in detail for better understanding of the invention, but not necessarily limited to what has all the configurations described.

Also, part of the configuration of one embodiment can be replaced with that of another configuration, and it is possible to add to the configuration of one embodiment to that of another embodiment. Further, part of the configuration of each embodiment can be augmented with, deleted or replaced with another configuration.

In addition, every configuration, function or processing unit can be realized by software by formulating a program to realize part or the whole thereof and, obviously, part or the whole thereof can be realized by hardware by designing them in an integrated circuit.

As so far described in detail, the specification of this application discloses not only the aspects of the invention stated in the claims but also various other aspects of the invention. These aspects are stated below exemplarily.

Example 1

A bandwidth policing apparatus of Example 1 is provided with a plurality each of receiving lines and sending lines; detects flows each comprising a set of packets by at least one of an input physical line number, an input logical line number and packet header information of the packet; polices the bandwidth of each flow; if the sender of the packets constituting a detected flow is provided with a function to respond to a congestion notification to control the transmit bandwidth according to a value representing the congestion state of the network out of packet headers of a response packet, gives a congestion notification to have the value representing the congestion state of the network rewritten out of packet headers of the received packet when the bandwidth of each of the flows surpasses a first threshold; and imposes a penalty on the packet, either to drop the packet or to rewrite a value representing the priority level in the network out of the packet headers, when the bandwidth of each of the flows surpasses a second threshold higher than the first threshold.

This bandwidth policing apparatus of Example 1 can prevent packets surpassing the policed bandwidth for each flow from unlimitedly flowing into the later stage of the network than the apparatus.

Example 2

The bandwidth policing apparatus described as Example 1 automatically sets either one or both of the first threshold and the second threshold by using the difference between the first threshold and the second threshold as a function of the round trip time of the packet.

The bandwidth policing apparatus of Example 2 can prevent the second threshold from posing a bottleneck and inviting a decline in effective bandwidth. After the bucket water amount CNT surpasses the first threshold, a length of time at least equivalent to the round trip time RTT of the packet is taken until the restraint on the transmit bandwidth is reflected in the bandwidth policed by the bandwidth policing apparatus. Since the bandwidth policing apparatus cannot achieve the effect of bandwidth restraint in that while, a certain quantity of packets based on congestion window control of TCP are transmitted from the sender. If a penalty on account of surpassing the second threshold on these packets might invite excess working of the congestion avoidance function of TCP and a resultant decline of the effective bandwidth. For this reason, it is necessary to keep the second threshold higher than the first threshold than a certain margin expected from congestion window control of RTT and TCP. To meet this requirement, automatic setting of either or both of the first threshold and the second threshold by the bandwidth policing apparatus makes possible threshold setting that can prevent the effective bandwidth from declining without requiring the manager of the bandwidth policing apparatus to estimate appropriate thresholds.

Example 3

The bandwidth policing apparatus described as Example 1 or Example 2 rewrites the value representing the congestion state of the network out of packet headers of the packet received by the apparatus with a probability predetermined for each value of bucket water amount.

The bandwidth policing apparatus of Example 3 can alter stepwise the probability of rewriting the value representing the congestion state of the network according to the value of bucket water amount. This enables the frequency of implanting the congestion avoidance function by mapping the relative levels of bucket water amount into the relative levels of rewriting probability.

Example 4

The bandwidth policing apparatus described as any of Example 1 to Example 3 polices the bandwidth on the basis of the leaky bucket algorithm.

The bandwidth policing apparatus of Example 4 can police the bandwidth on the basis of the leaky bucket algorithm.

Example 5

The bandwidth policing apparatus described as any of Example 1 to Example 3 polices the bandwidth on the basis of the window algorithm.

The bandwidth policing apparatus of Example 5 can police the bandwidth on the basis of the window algorithm.

Example 6

The bandwidth policing apparatus described as any of Example 1 to Example 5 gives a congestion notification on the basis of ECN (RFC3168).

The bandwidth policing apparatus of Example 6 can give a congestion notification on the basis of ECN (RFC3168).

Example 7

The bandwidth policing apparatus described as any of Example 1 to Example 6 uses any of TCP (RFC793), DCCP (RFC4340) or SCTP (RFC2960) as the transport protocol for packets constituting a flow.

The bandwidth policing apparatus of Example 7 uses any of TCP (RFC793), DCCP (RFC4340) or SCTP (RFC2960) as the transport protocol and can perform bandwidth policing on flows whose sender is provided with a function to respond to a congestion notification.

Example 8

The bandwidth policing apparatus described as any of Example 1 to Example 7, where the sender of packets constituting a detected flow is a terminal provided with no function to respond to the congestion notifying function but equipped with a congestion avoidance function, drops packets with a probability predetermined for each value of bucket water amount if the bandwidth for each flow surpasses the first threshold and drops the packet if the bandwidth for each flow surpasses the second threshold.

The bandwidth policing apparatus of Example 8 can collectively subject flows that have a function to respond to a congestion notification and flows that have no function to respond to a congestion notification to bandwidth policing, and appropriately urge congestion avoidance according to the presence or absence of the congestion notifying function.

Example 9

The bandwidth policing apparatus described as any of Example 1 to Example 8, where the sender of packets constituting a detected flow has neither a function to respond to the congestion notification nor a congestion avoidance function, drops the packet if the bandwidth for each flow surpasses the second threshold.

The bandwidth policing apparatus of Example 9 can collectively subject flows that have a function to respond to a congestion notification and flows that have no function to avoid congestion to bandwidth policing, and prevent probability-based packet drops which are unnecessary for flows having no congestion avoidance function while urging only the flows having the congestion avoidance function to appropriately avoid congestion.

Example 10

The bandwidth policing apparatus described as any of Example 1 to Example 7 independently polices the bandwidth of a flow comprising packets whose sender is a terminal provided with a function to respond to the congestion notification and the bandwidth of a flow comprising packets whose sender is a terminal provided with neither a function to respond to the congestion notification nor a function to avoid congestion.

The bandwidth policing apparatus of Example 10 can independently subject a flow comprising packets provided with a function to respond to the congestion notification and a flow provided with no function to respond to the congestion to bandwidth policing.

Example 11

The bandwidth policing apparatus described as Example 10, where the sender of packets constituting a detected flow is a terminal provided with no function to respond to the congestion notifying function but equipped with a congestion avoidance function, drops packets with a probability predetermined for each value of bucket water amount if the bandwidth for each flow surpasses the first threshold and drops the packet if the bandwidth for each flow surpasses the second threshold.

The bandwidth policing apparatus of Example 11 can independently subject a flow comprising packets provided with a function to respond to the congestion notification and a flow provided with no function to respond to the congestion to bandwidth policing, and appropriately urge congestion avoidance according to the presence or absence of the congestion notifying function.

Example 12

The bandwidth policing apparatus described as any of Example 1 to Example 7 or Example 10 independently polices the bandwidth of a flow comprising packets whose sender is a terminal provided with a function to respond to the congestion notification and the bandwidth of a flow comprising packets whose sender is a terminal provided with neither a function to respond to the congestion notification nor a congestion avoidance function.

The bandwidth policing apparatus of Example 12 can collectively subject flows that have a congestion avoidance function and flows that have no congestion avoidance function to bandwidth policing.

Example 13

The bandwidth policing apparatus of Example 12, where the sender of packets constituting a detected flow is a terminal provided with neither a function to respond to the congestion notification nor a congestion avoidance function, drops the packet if the bandwidth for each flow surpasses the second threshold.

The bandwidth policing apparatus of Example 13 can collectively subject flows that have a congestion avoidance function and flows that have no function to avoid congestion to bandwidth policing, and prevent probability-based packet drops which are unnecessary for flows having no congestion avoidance function while urging only the flows having the congestion avoidance function to appropriately avoid congestion.

Example 14

The bandwidth policing apparatus described as any of Example 1 to Example 13 picks up statistics of at least either of the number of packets and the number of bytes having given a congestion notification, statistics of at least either of the number of packets and the number of bytes of packets dropped, having undergone rewriting of the priority level in the network or having undergone alteration of the priority level in the apparatus, and statistics of at least either of the number of packets and the number of bytes of packets on which the penalty has not been imposed.

The bandwidth policing apparatus of Example 14 can pick up statistics on each of the penalties to packets.

Example 15

In a bandwidth policing method for packets in the packet relay apparatus of Example 14, the packet relay apparatus is provided with a packet sending/receiving unit, a packet search unit and a packet relay processing unit connected to sending and receiving lines; receives packets from the sender; detects flows each comprising a set of the packets; polices the bandwidth of each of the flows; if the sender has a function to respond to a congestion notification to control the transmit bandwidth according to a value representing the congestion state of the network out of packet headers of a response packet, gives a congestion notification to have the value representing the congestion state of the network rewritten out of packet headers of the received packet when the bandwidth of each of the flows surpasses a first threshold; and impose on the packet one of the penalties including packet drop, rewriting the value representing the priority level in the network out of the packet headers and altering the priority level in the apparatus when the bandwidth of each of the flows surpasses a second threshold higher than the first threshold.

This bandwidth policing method of Example 15 can prevent packets surpassing the policed bandwidth for each flow from unlimitedly flowing into the later stage of the network than the packet relay apparatus.

What is claimed is:

1. A bandwidth policing apparatus for packets on a network comprising:
    a packet receiving circuit that is connected to a receiving line and receives packets from a sender, and
    a packet search circuit that searches the packets received by the packet receiving circuit, detects flows each comprising a set of the packets, and polices a respective bandwidth of each of the flows based on a leaky bucket algorithm,
    wherein, where the sender of the packets constituting a detected flow is provided with a function to respond to a congestion notification to control a transmit bandwidth according to a value representing a congestion state of the network out of packet headers of a response packet, the packet search circuit, when a bucket amount of the detected flow related to the leaky bucket algorithm surpasses a first threshold, sends a response packet including a congestion notification representing a congestion state of the network rewritten out of packet headers of the one of the flows to the sender, and
    when a bucket amount of the detected flow surpasses a second threshold higher than the first threshold, imposes a penalty on one or more packets of the detected flow;
    wherein where the sender of the packets constituting a detected flow is not provided with a function to respond to the congestion notification but is provided with a function to avoid congestion, the packet search circuit, when the bandwidth of the detected flow surpasses the first threshold, drops one or more packets of the detected flow according to a probability predetermined for each value of a bucket water amount, and
    when a bucket amount of the detected flow surpasses the second threshold, drops one or more packets of the detected flow,
    wherein where the sender of the packets constituting a detected flow is not provided with either a function to respond to the congestion notification nor a function to avoid congestion, the packet search circuit, when a bucket amount of the detected flow surpasses the second threshold, drops one or more packets of the detected flow.

2. The bandwidth policing apparatus according to claim 1, wherein
    the packet search circuit drops the packet, rewrites a value indicating a priority level of the packet header in the network or alters a drop priority of the packet as the penalty.

3. The bandwidth policing apparatus according to claim 1, wherein
    the packet search circuit detects the flows by at least one of an input physical line number, an input logical line number, and packet header information of the respective packets.

4. The bandwidth policing apparatus according to claim 1, wherein
    either one or both of the first threshold and the second threshold are automatically set by using the difference between the first threshold and the second threshold as a function of a round trip time of the packet.

5. The bandwidth policing apparatus according to claim 1, wherein
    the packet search circuit, when the bucket amount of the detected flows surpasses the first threshold, rewrites a value representing the congestion state of the network out of packet headers of the one of the flows according to a probability predetermined for each value of a bucket water amount of a leaky bucket algorithm.

6. The bandwidth policing apparatus according to claim 1, wherein
    the packet search circuit polices bandwidths on the basis of a leaky bucket algorithm.

7. The bandwidth policing apparatus according to claim 1, wherein
    the packet search circuit polices bandwidths on the basis of a window algorithm.

8. The bandwidth policing apparatus according to claim 1, wherein
    the packet search circuit:
    receives packets from more than one sender; and
    independently polices the bandwidth of one of the flows comprising packets whose sender is a terminal provided with a function to respond to the congestion notification and the bandwidth of one of the flows comprising packets whose sender is a terminal not provided with a function to respond to the congestion notification but provided with a function to avoid congestion.

9. The bandwidth policing apparatus according to claim 1, wherein
the packet search circuit:
receives packets from more than one sender; and
independently polices the bandwidth of one of the flows comprising packets whose sender is a terminal provided with a function to respond to the congestion notification and the bandwidth of one of the flows comprising packets whose sender is a terminal provided with neither a function to respond to the congestion notification nor a function to avoid congestion.

10. The bandwidth policing apparatus according to claim 1, wherein
the packet search circuit picks up statistics of at least either of a number of packets and a number of bytes having given a congestion notification, statistics of at least either of the number of packets and the number of bytes of packets having undergone the penalty, and statistics of at least either of the number of packets and the number of bytes of packets on which the penalty has not been imposed.

11. The bandwidth policing apparatus according to claim 1, wherein
the packet search circuit provides the congestion notification on the basis of Explicit Congestion Notification (ECN).

12. The bandwidth policing apparatus according to claim 1, wherein the response packet including the congestion notification is sent to the sender of the one of the flows when the sender has a function to respond to the congestion notification to control the bandwidth according to a value representing the congestion state of the network included in the congestion notification.

13. A bandwidth policing method for packets on a network, the method comprising:
receiving packets from a sender; searching the received packets;
detecting flows each comprising a set of the packets;
policing a respective bandwidth of each of the flows based on a leaky bucket algorithm;

where the sender of the packets constituting a detected flow is provided with a function to respond to a congestion notification to control a transmit bandwidth according to a value representing a congestion state of the network out of packet headers of a response packet, and when a bucket amount of the detected flow related to the leaky bucket algorithm surpasses a first threshold, a step of sending a response packet including a congestion notification representing a congestion state of the network rewritten out of packet headers of the one of the flows to the sender; and when the bandwidth of the one of the flows surpasses a second threshold higher than the first threshold, a step of imposing a penalty on one or more packets of the one of the flows;

where the sender of the packets constituting a detected flow is not provided with a function to respond to the congestion notification but is provided with a function to avoid congestion, and when a bucket amount of the detected flow surpasses the first threshold, a step of dropping one or more packets of the detected flow with a probability predetermined for each value of a bucket water amount, and when a bucket amount of the detected flow surpasses the second threshold, a step of dropping one or more packets of the detected flow; and where the sender of the packets constituting a detected flow is not provided with either a function to respond to the congestion notification nor a function to avoid congestion, and when a bucket amount of the detected flow surpasses the second threshold, a step of dropping one or more packets of the detected flow.

14. The method of claim 13, wherein the response packet including the congestion notification is sent to the sender of the one of the flows when the sender has a function to respond to the congestion notification to control the bandwidth according to a value representing the congestion state of the network included in the congestion notification.

* * * * *